(12) United States Patent
Ma et al.

(10) Patent No.: US 11,837,090 B2
(45) Date of Patent: Dec. 5, 2023

(54) SYSTEM AND METHODS OF ADAPTIVE TRAFFIC RULE-BASED DECISION MAKING FOR AUTONOMOUS DRIVING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/817,945

(22) Filed: Aug. 5, 2022

(65) Prior Publication Data
US 2023/0040017 A1  Feb. 9, 2023

Related U.S. Application Data

(60) Provisional application No. 63/366,738, filed on Jun. 21, 2022, provisional application No. 63/229,850, (Continued)

(51) Int. Cl.
*G08G 1/0967* (2006.01)
*G05D 1/00* (2006.01)
(Continued)

(52) U.S. Cl.
CPC ....... *G08G 1/096725* (2013.01); *B60W 30/09* (2013.01); *B60W 40/04* (2013.01);
(Continued)

(58) Field of Classification Search
CPC .......... G08G 1/096725; G08G 1/0108; G05D 1/0088; G05D 2201/0213; B60W 30/09;
(Continued)

(56) References Cited

U.S. PATENT DOCUMENTS

| 9,511,767 B1 | 12/2016 | Okumura et al. |
| 2014/0195093 A1 | 7/2014 | Litkouhi et al. |

(Continued)

FOREIGN PATENT DOCUMENTS

AU     2017100399 A4     5/2017

OTHER PUBLICATIONS

Furda et al., Real-time decision making for autonomous city vehicles, Journal of Robotics and Mechatronics, 22(6), pp. 694-701, 2010.
(Continued)

*Primary Examiner* — Yuen Wong
(74) *Attorney, Agent, or Firm* — Maschoff Brennan

(57) ABSTRACT

A method may include obtaining input information relating to an environment in which an autonomous vehicle (AV) operates. The input information may describe a state of the AV, an operation of the AV within the environment, a property of the environment, or an object included in the environment. The method may include setting up a traffic rule profile for the AV that specifies societal traffic practices corresponding to a location of the environment. The method may include identifying a first traffic rule relevant to the AV based on the obtained input information and determining a first decision corresponding to the traffic rule profile and the first traffic rule. The method may include sending an instruction to a control system of the AV, the instruction describing a given operation of the AV responsive to the traffic rule profile and the first traffic rule according to the first decision.

17 Claims, 13 Drawing Sheets

Related U.S. Application Data filed on Aug. 5, 2021, provisional application No. 63/229,852, filed on Aug. 5, 2021, provisional application No. 63/229,856, filed on Aug. 5, 2021.

(51) Int. Cl.
  *G08G 1/01* (2006.01)
  *B60W 60/00* (2020.01)
  *B60W 40/04* (2006.01)
  *B60W 50/00* (2006.01)
  *B60W 30/09* (2012.01)

(52) U.S. Cl.
  CPC .... *B60W 50/0097* (2013.01); *B60W 60/0015* (2020.02); *B60W 60/0027* (2020.02); *G05D 1/0088* (2013.01); *G08G 1/0108* (2013.01); *B60W 2552/53* (2020.02); *B60W 2554/20* (2020.02); *B60W 2554/404* (2020.02); *B60W 2554/4026* (2020.02); *B60W 2554/80* (2020.02); *B60W 2555/60* (2020.02); *G05D 2201/0213* (2013.01)

(58) Field of Classification Search
  CPC ............. B60W 40/04; B60W 50/0097; B60W 60/0015; B60W 60/0027; B60W 2552/53; B60W 2554/20; B60W 2554/4026; B60W 2554/404; B60W 2554/80; B60W 2555/60
  See application file for complete search history.

(56) References Cited

U.S. PATENT DOCUMENTS

| | | |
|---|---|---|
| 2016/0180707 A1 | 6/2016 | Macneille et al. |
| 2017/0228604 A1 | 8/2017 | Ferguson et al. |
| 2017/0284812 A1 | 10/2017 | Kim et al. |
| 2019/0152490 A1 | 5/2019 | Lan et al. |
| 2020/0103532 A1 | 4/2020 | Lowe et al. |
| 2020/0331491 A1 | 10/2020 | Wray et al. |
| 2021/0018916 A1 | 1/2021 | Thakur et al. |
| 2021/0294323 A1* | 9/2021 | Bentahar ............... B60W 50/00 |

OTHER PUBLICATIONS

PCT International Search Report and Written Opinion issued in corresponding application No. PCT/US2022/039641, dated Oct. 27, 2022.

Li et al., Fast Trajectory in Cartesian rather than Frenet Frame: A Precise Solution for Autonomous Driving in Complex Urban Scenarios, Preprints of the 21st IFAC World Congress (Virtual), Berlin Germany, Jul. 12-17, 2020.

PCT International Search Report and Written Opinion issued in corresponding application No. PCT/US2022/039640, dated Oct. 25, 2022.

International Search Report and Written Opinion of the International Searching Authority dated Dec. 28, 2022 as received in Application No. PCT/US2022/039642.

* cited by examiner

SYSTEM AND METHODS OF ADAPTIVE TRAFFIC RULE-BASED DECISION MAKING FOR AUTONOMOUS DRIVING

CROSS-REFERENCE TO RELATED APPLICATIONS

This application claims the benefit of U.S. Patent Application Ser. No. 63/229,850, filed on Aug. 5, 2021, U.S. Patent Application Ser. No. 63/229,852, filed on Aug. 5, 2021, U.S. Patent Application Ser. No. 63/229,856, filed on Aug. 5, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of adaptive traffic rule-based decision making for autonomous driving.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining input information relating to an environment in which an autonomous vehicle (AV) operates, the input information describing at least one of: a state of the AV, an operation of the AV within the environment, a property of the environment, or an object included in the environment. The method may include setting up a traffic rule profile for the AV based on the input information, the traffic rule profile specifying societal traffic practices corresponding to a location of the environment in which the AV operates. The method may include identifying a first traffic rule relevant to the AV based on the obtained input information and determining a first decision corresponding to the traffic rule profile and the first traffic rule. The method may include sending an instruction to a control system of the AV, the instruction describing a given operation of the AV responsive to the traffic rule profile and the first traffic rule according to the first decision.

In some embodiments, the method may further include identifying a second traffic rule relevant to the AV based on the obtained input information and determining a third decision based on the first decision and a second decision corresponding to the second traffic rule, wherein the instruction describing the given operation of the AV is further based on the third decision. The third decision may result in the given operation of the AV satisfying the first decision and the second decision. Additionally or alternatively, the third decision may result in the given operation of the AV satisfying only the first decision or only the second decision according to a priority order.

In some embodiments, the traffic rule may include at least one of: a bike lane rule, a traffic light rule, a highway merge rule, a stop sign rule, or a construction zone rule.

In some embodiments, identifying the first traffic rule may include estimating an expected duration of the first traffic rule and assessing an applicability of the first traffic rule to the AV after the expected duration has elapsed.

In some embodiments, setting up the traffic rule profile for the AV may include determining the location in which the AV is operating based on the input information, identifying the societal traffic practices associated with the location, and compiling the societal traffic practices as the traffic rule profile.

One or more embodiments of the present disclosure may include one or more non-transitory computer-readable storage media configured to store instructions that, in response to being executed, cause a system to perform operations. The operations may include obtaining input information relating to an environment in which an autonomous vehicle (AV) operates, the input information describing at least one of: a state of the AV, an operation of the AV within the environment, a property of the environment, or an object included in the environment. The operations may include setting up a traffic rule profile for the AV based on the input information, the traffic rule profile specifying societal traffic practices corresponding to a location of the environment in which the AV operates. The operations may include identifying a first traffic rule relevant to the AV based on the obtained input information and determining a first decision corresponding to the traffic rule profile and the first traffic rule. The operations may include sending an instruction to a control system of the AV, the instruction describing a given operation of the AV responsive to the traffic rule profile and the first traffic rule according to the first decision.

In some embodiments, the operations may further include identifying a second traffic rule relevant to the AV based on the obtained input information and determining a third decision based on the first decision and a second decision corresponding to the second traffic rule, wherein the instruction describing the given operation of the AV is further based on the third decision. The third decision may result in the given operation of the AV satisfying the first decision and the second decision. Additionally or alternatively, the third decision may result in the given operation of the AV satisfying only the first decision or only the second decision according to a priority order.

In some embodiments, the traffic rule may include at least one of: a bike lane rule, a traffic light rule, a highway merge rule, a stop sign rule, or a construction zone rule.

In some embodiments, identifying the first traffic rule may include estimating an expected duration of the first traffic rule and assessing an applicability of the first traffic rule to the AV after the expected duration has elapsed.

In some embodiments, setting up the traffic rule profile for the AV may include determining the location in which the AV is operating based on the input information, identifying the societal traffic practices associated with the location, and compiling the societal traffic practices as the traffic rule profile.

One or more embodiments of the present disclosure may include one or more processors and one or more non-transitory computer-readable storage media configured to store instructions that, in response to being executed, cause the system to perform operations. The operations may include obtaining input information relating to an environment in which an autonomous vehicle (AV) operates, the input information describing at least one of: a state of the AV, an operation of the AV within the environment, a property of the environment, or an object included in the environment. The operations may include setting up a traffic rule profile for the AV based on the input information, the traffic rule profile specifying societal traffic practices corresponding to a location of the environment in which the AV operates. The operations may include identifying a first traffic rule relevant to the AV based on the obtained input information and determining a first decision corresponding to the traffic rule profile and the first traffic rule. The operations may include sending an instruction to a control system of the AV, the instruction describing a given operation of the AV responsive to the traffic rule profile and the first traffic rule according to the first decision.

In some embodiments, the operations may further include identifying a second traffic rule relevant to the AV based on the obtained input information and determining a third decision based on the first decision and a second decision corresponding to the second traffic rule, wherein the instruction describing the given operation of the AV is further based on the third decision. The third decision may result in the given operation of the AV satisfying the first decision and the second decision. Additionally or alternatively, the third decision may result in the given operation of the AV satisfying only the first decision or only the second decision according to a priority order.

In some embodiments, identifying the first traffic rule may include estimating an expected duration of the first traffic rule and assessing an applicability of the first traffic rule to the AV after the expected duration has elapsed.

In some embodiments, setting up the traffic rule profile for the AV may include determining the location in which the AV is operating based on the input information, identifying the societal traffic practices associated with the location, and compiling the societal traffic practices as the traffic rule profile.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
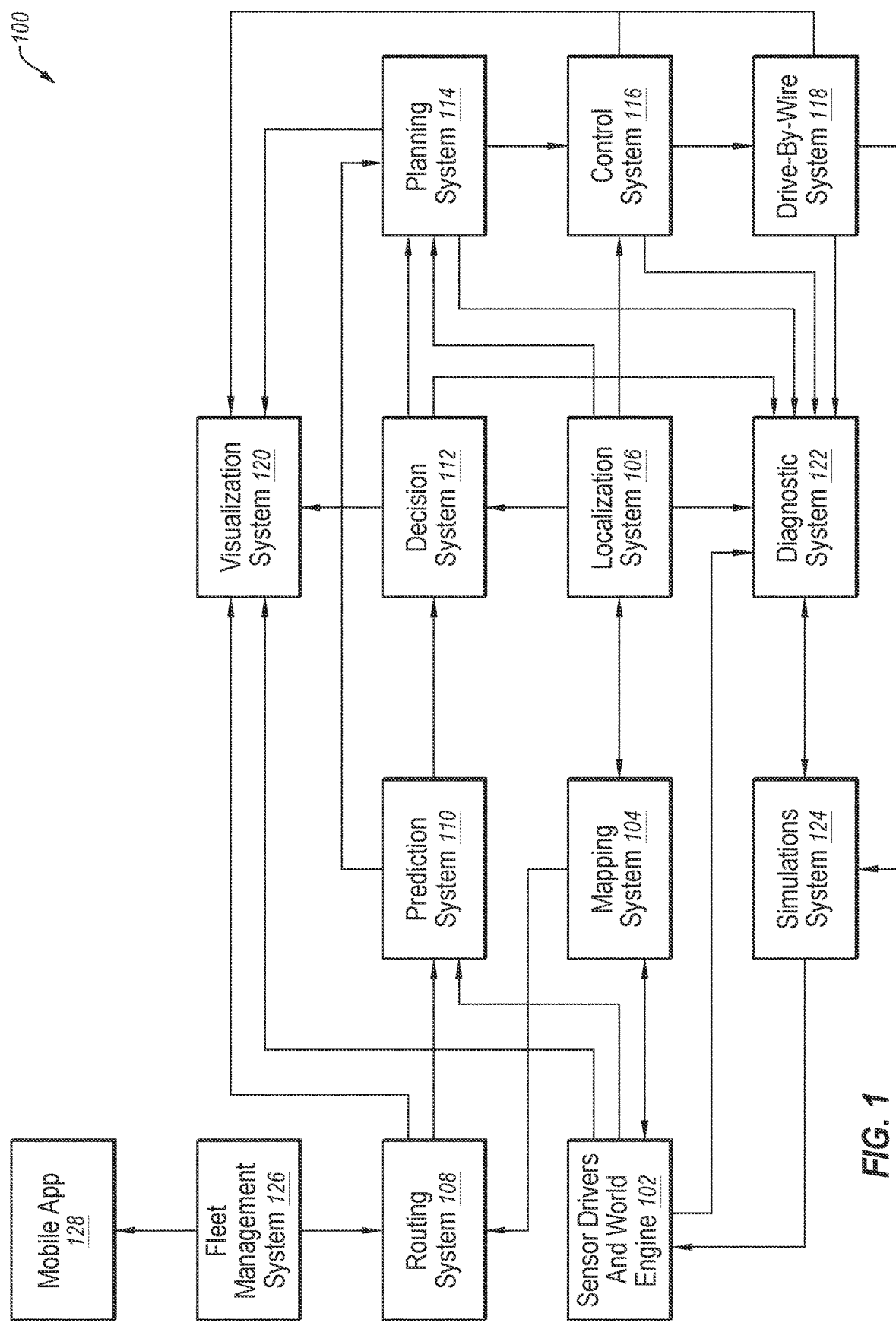
FIG. 1 illustrates an example embodiment of an autonomous driving system according to at least one embodiment of the present disclosure.

The present disclosure relates to making behavioral decisions for operation of an autonomous vehicle (AV). Behavioral decisions made by the AV may require the AV to follow a variety of rules, guidelines, and/or best practices that vary depending on an environment in which the AV is driving and/or what objects are present in the vicinity of the AV. Additionally or alternatively, making behavioral decisions for the AV may require adhering to all conditions associated with a given environment and/or the objects in the vicinity of the AV rather than only some of the applicable conditions. Existing methods and/or systems of making behavioral decisions for operations of the AV may not be capable of making behavioral decisions that consistently account for the environment in which the AV is operating and/or the objects included in the environment.

Additionally or alternatively, the present disclosure relates to making traffic decisions for operation of the AV. Traffic decisions made by the AV may facilitate the AV making a decision that takes into account attempts to follow a variety of rules, guidelines, and/or best practices of traffic that vary depending on an environment in which the AV is driving. Additionally or alternatively, making traffic decisions for the AV may include adhering to all conditions associated with a given environment rather than only some of the applicable conditions. Existing methods and/or systems of making traffic decisions for operations of the AV may not be capable of making traffic decisions that consistently account for all aspects of the environment in which the AV is operating. A method and/or a system of traffic decision-making according to at least one embodiment of the present disclosure may be configured to determine one or more traffic decisions responsive to a driving context and/or environment of the AV.

Additionally or alternatively, the present disclosure relates to making decisions for operation of the AV which may be based on objects around the AV. Object-based decisions made by the AV may allow the AV to follow a variety of rules, guidelines, and/or best practices that vary depending on an environment in which the AV is driving and/or what objects are present in the vicinity of the AV. Making object-based decisions for the AV may involve adhering to all conditions associated with a given environment and/or the objects in the vicinity of the AV rather than only some of the applicable conditions. Additionally or alternatively, making object-based decisions for the AV may include complying with a highest priority, most important, or otherwise selected rule or governing principle despite other conflicting rules. Existing methods and/or systems of making object-based decisions for operations of the AV may not be capable of making such decisions that consistently account for the environment in which the AV is operating and/or the objects included in the environment. A method and/or a system of object-based decision making according to at least one embodiment of the present disclosure may include determining one or more one or more object-based decisions responsive to the existence and/or movement of one or more objects in the vicinity of the AV.

Embodiments of the present disclosure will be explained with reference to the accompanying drawings.

The present disclosure relates to making behavioral decisions for operation of an autonomous vehicle (AV). Behavioral decisions made by the AV may require the AV to follow a variety of rules, guidelines, and/or best practices that vary depending on an environment in which the AV is driving and/or what objects are present in the vicinity of the AV. Additionally or alternatively, making behavioral decisions for the AV may require adhering to all conditions associated with a given environment and/or the objects in the vicinity of the AV rather than only some of the applicable conditions. Existing methods and/or systems of making behavioral decisions for operations of the AV may not be capable of making behavioral decisions that consistently account for the environment in which the AV is operating and/or the objects included in the environment.

Additionally or alternatively, the present disclosure relates to making traffic decisions for operation of the AV. Traffic decisions made by the AV may facilitate the AV making a decision that takes into account attempts to follow a variety of rules, guidelines, and/or best practices of traffic that vary depending on an environment in which the AV is driving. Additionally or alternatively, making traffic decisions for the AV may include adhering to all conditions associated with a given environment rather than only some of the applicable conditions. Existing methods and/or systems of making traffic decisions for operations of the AV may not be capable of making traffic decisions that consistently account for all aspects of the environment in which the AV is operating. A method and/or a system of traffic decision-making according to at least one embodiment of the present disclosure may be configured to determine one or more traffic decisions responsive to a driving context and/or environment of the AV.

Additionally or alternatively, the present disclosure relates to making decisions for operation of the AV which may be based on objects around the AV. Object-based decisions made by the AV may allow the AV to follow a variety of rules, guidelines, and/or best practices that vary depending on an environment in which the AV is driving and/or what objects are present in the vicinity of the AV. Making object-based decisions for the AV may involve adhering to all conditions associated with a given environment and/or the objects in the vicinity of the AV rather than only some of the applicable conditions. Additionally or alternatively, making object-based decisions for the AV may include complying with a highest priority, most important, or otherwise selected rule or governing principle despite other conflicting rules. Existing methods and/or systems of making object-based decisions for operations of the AV may not be capable of making such decisions that consistently account for the environment in which the AV is operating and/or the objects included in the environment. A method and/or a system of object-based decision making according to at least one embodiment of the present disclosure may include determining one or more one or more object-based decisions responsive to the existence and/or movement of one or more objects in the vicinity of the AV.

A method and/or a system of behavioral decision-making according to at least one embodiment of the present disclosure may be configured to determine one or more traffic decision components responsive to a driving context and/or environment of the AV and one or more object decision components. A behavioral decision-making system according to the present disclosure may determine a behavioral decision based on the traffic decision components and the object decision components and instruct the AV to execute the determined behavioral decision.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
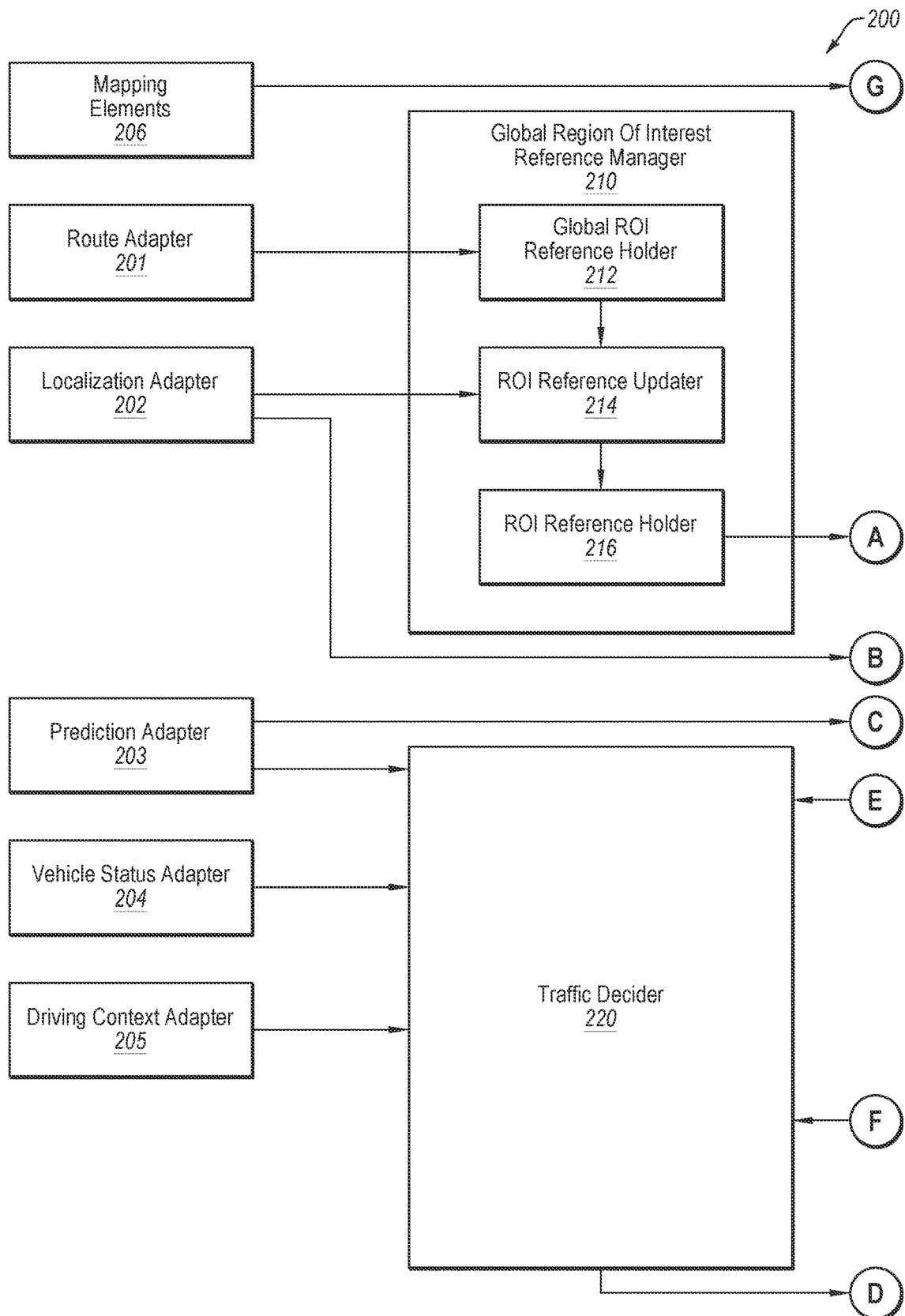
FIGS. 2A-2C illustrate an example behavioral decision-making system according to at least one embodiment of the present disclosure.
Figure 2B:
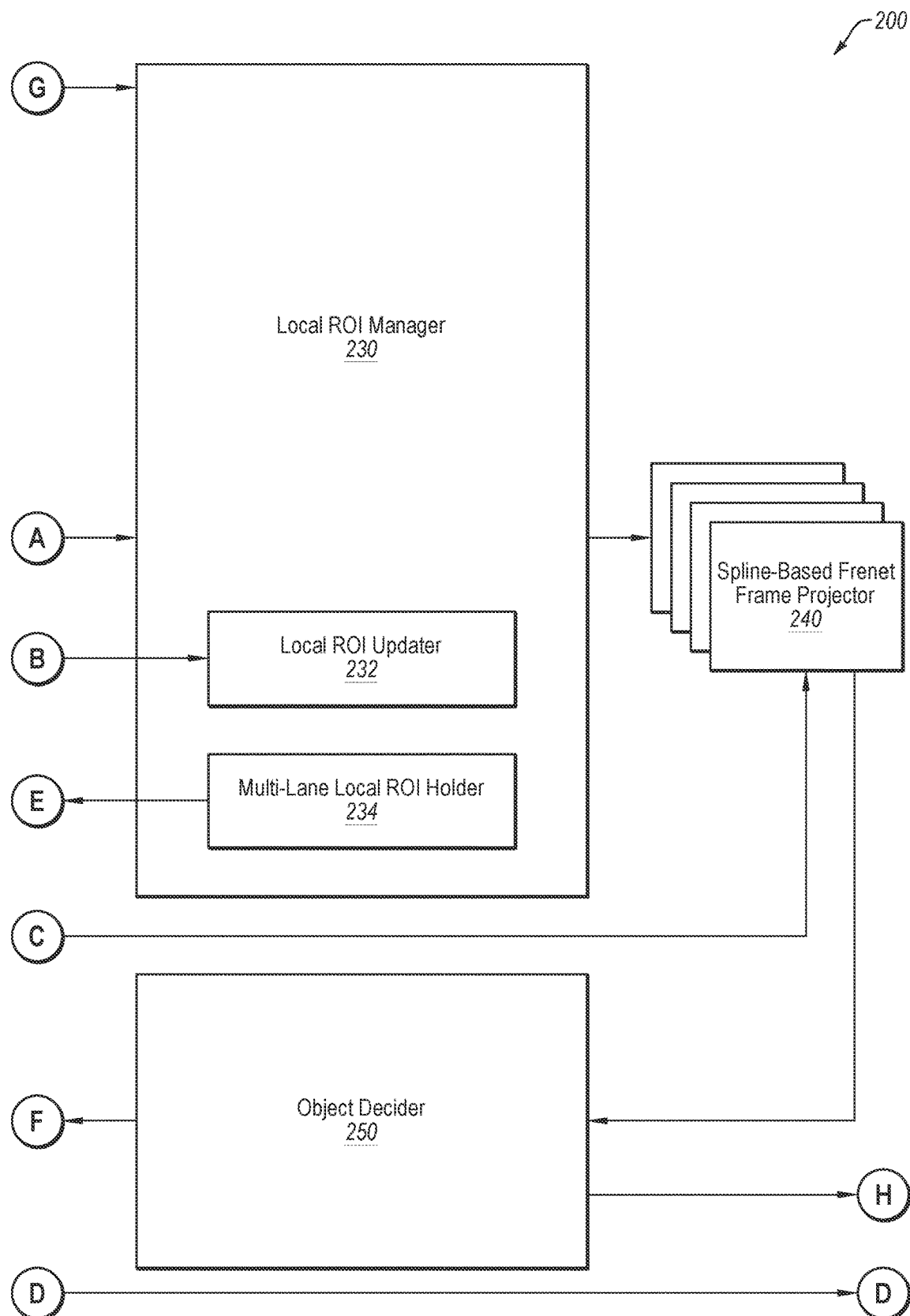
Figure 2C:
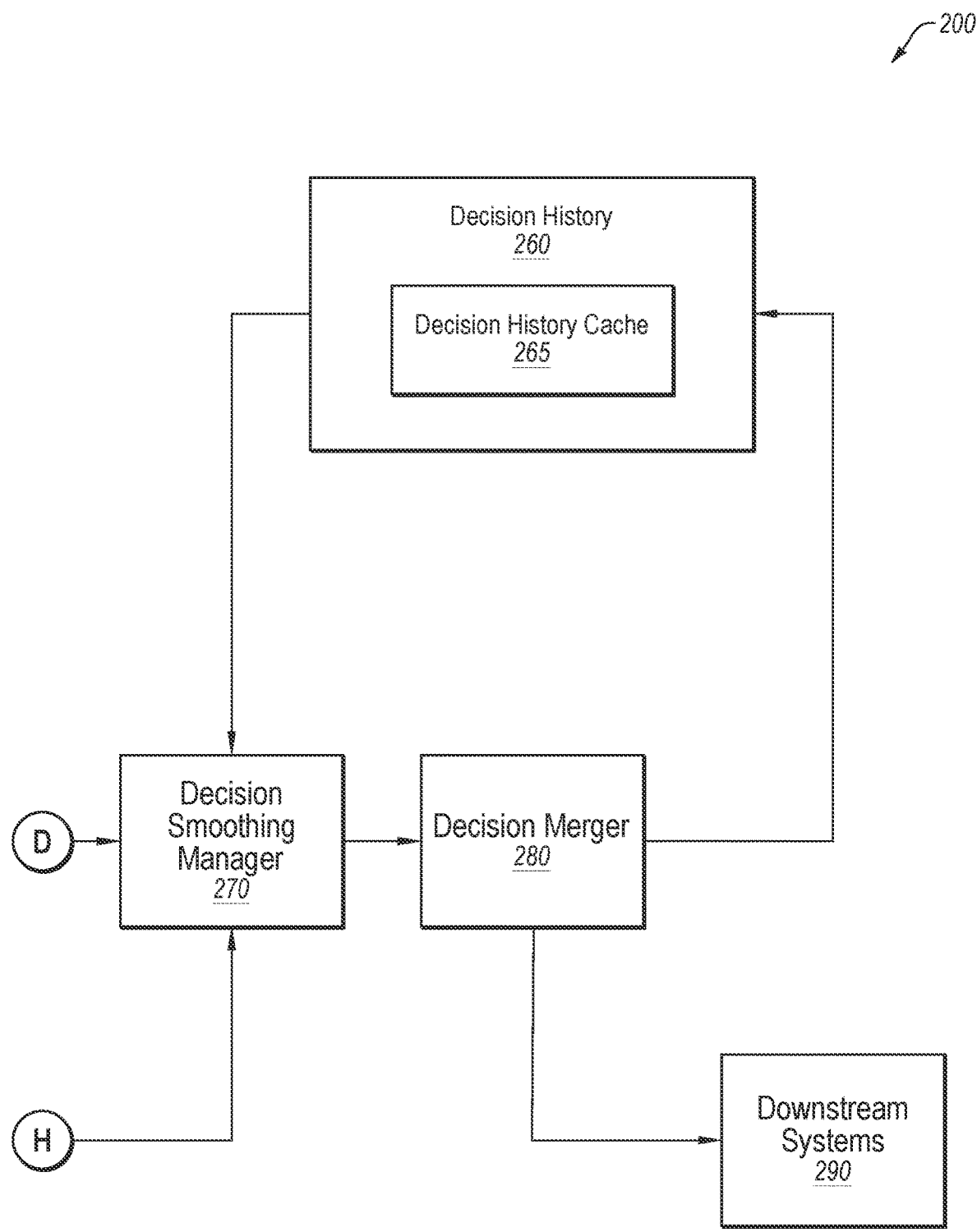

FIGS. 2A-2C illustrates an example behavioral decision-making system 200 according to the present disclosure. Elements of the behavioral decision-making system 200, including, for example, a global region of interest reference manager 210, a global region of interest reference holder 212, a region of interest reference updater 214, a region of interest reference holder 216, a traffic decider 220, a local region of interest manager 230, a local region of interest updater 232, a multi-lane local region of interest holder 234, a spline-based Frenet frame projector 240, an object decider 250, a decision history 260, a decision history cache 265, a decision smoothing manager 270, and/or a decision merger 280 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to information provided by a route adapter 201, a localization adapter 202, a prediction adapter 203, a vehicle status adapter 204, a driving context adapter 205, and/or mapping elements 206 as described in further detail below in relation to method 700 of FIG. 7.

In some embodiments, the behavioral decision-making system 200 may obtain one or more types of inputs. The inputs may be obtained from one or more computing systems configured to identify and/or determine information about the AV, an environment around the AV, and/or objects included in the environment around the AV. For example, the behavioral decision-making system 200 may obtain route information from a route adapter 201 that describes a trajectory and/or projected pathing of the AV, localization information from a localization adapter 202 that describes a location and/or orientation of the AV, and/or status information from a vehicle status adapter 204 that describes a state of computing systems and/or mechanical systems associated with operations of the AV. As another example, the behavioral decision-making system 200 may obtain driving context information from a driving context adapter 205 that describes an environment in which the AV is operating (e.g., indoors versus outdoors, highway road versus warehouse lanes, etc.). As another example, the behavioral decision-making system 200 may obtain object-trajectory prediction results from a prediction adapter 203. As another example, the behavioral decision-making system 200 may obtain mapping elements 206 that describe a map related to the operations and/or localization of the AV. Additionally or alternatively, the inputs may include raw sensor data and/or processed sensor data measuring the world around the AV. For example, the environment, the objects, the context, and/or the state of the AV may be based on sensor data and/or processing of sensor data. As another example, a computing system such as the localization adapter 202 may utilize sensor data to derive other information, such as the location of the AV within a mapped region based on detected physical sensor data.

The inputs obtained by the behavioral decision-making system 200 may be sent to one or more different computing modules according to the type of information that the inputs describe. In some embodiments, for example, a global region of interest reference manager 210 may be configured to obtain information related to movement of the AV, which may include the route information and/or the localization information. The global region of interest reference manager 210 may be configured to determine a region of interest for the AV that defines a space in which objects are considered relevant to decisions made by the AV. In these and other embodiments, the region of interest determined by the global region of interest reference manager 210 may be defined with respect to a semantic map that describes the relevance of one or more aspects of the environment around the AV. For example, the semantic map may include a map that provides meaning of various objects, surfaces, etc. such as identifying a region of a roadway as a crosswalk with an associated set of rules. Stated another way, a semantic map does not simply represent a topographical set of contours, but includes meaning with associated rules for various components of the map. In some embodiments, the region of interest may represent an area or region as perceived from a given frame of reference (e.g., as perceived from the frame of reference of the AV) that includes one or more interest points (e.g., objects and/or aspects of the environment included in the frame of reference) relevant to making driving decisions of the AV.

In some embodiments, the global region of interest reference manager 210 may include a global region of interest reference holder 212 that is configured to obtain information from the route adapter 201 and identify one or more regions of interest that track the route of the AV. In these and other embodiments, the regions of interest may include positive regions of interest, which may represent regions along the AV's route that the global region of interest reference holder 212 determines or identifies as potentially containing objects, environmental factors, or other information relevant to operations of the AV. Additionally or alternatively, the regions of interest may include negative regions of interest that may represent regions along the AV's route that are likely to be irrelevant to operations of the AV. In some situations, a given route may involve the AV traveling past, for example, a four-way intersection in which a first corner of the four-way intersection includes a store with a glass storefront, a second corner that includes a gas station, and a third corner that includes a strip mall. Once the AV reaches the four-way intersection, the AV may identify walking shoppers beyond the glass storefront because of the transparency of the storefront. However, the identified shoppers are unlikely to walk into the path of the AV regardless of the trajectories of the shoppers because they are located within the store associated with the glass storefront. In some embodiments, a first region of interest identified by the global region of interest reference holder 212 may indicate that the store associated with the glass storefront includes information that is not relevant to operations of the AV based on prior knowledge that any objects, such as pedestrians, identified within boundaries of the store are unlikely to move past such boundaries. The first region may be characterized as a negative region. The second corner and the third corner may each be identified as a second region of interest and/or a third region of interest, respectively, that includes information that is relevant to the operations of the AV because objects, such as other vehicles, in the vicinity of the gas station and/or the strip mall may move into the street on which the AV is driving. The second corner and the third corner may include examples of positive regions as they may or may not include objects, environmental factors, or other information relevant to operations of the AV. In these and other embodiments, the global region of interest reference holder 212 may be configured to identify regions of interest based on a semantic map that provides semantic interpretations of areas in and/or around the route provided by the route adapter 201. A given region of interest identified by the global region of interest reference holder 212 may include, for example, a roadway, storefronts along the roadway, traffic intersections, or some combination thereof based on the route information and/or the localization information corresponding to the AV.

The one or more regions of interest identified by the global region of interest reference holder 212 may be sent to a region of interest reference updater 214 that is configured to limit the areas in which the regions of interest may be identified based on the localization of the AV as provided by the localization adapter 202. Along the route of the AV, multiple regions of interest may be identified, but not all of the multiple regions of interest may be relevant to operations of the AV at a given point of time. For example, a given AV route may involve the AV traveling past a first intersection and a second intersection in which each of the first intersection and the second intersection include two regions of interest. However, the two regions of interest associated with the first intersection may or may not be relevant to operations of the AV regardless of the information included in or associated with the two regions of interest if the AV is not approaching and/or positioned at the first intersection. If the AV has moved past the first intersection by a threshold distance, the region of interest reference updater 214 may determine that the two regions of interest identified in relation to the first intersection are no longer relevant to operations of the AV, while the two regions of interest identified in relation to the second intersection remain relevant to the operations of the AV. In some embodiments, the region of interest reference updater 214 may be configured to identify one or more of the regions of interest identified by the global region of interest reference holder 212 that are no longer relevant to the operations of the AV. In these and other embodiments, the region of interest reference updater 214 may send information relating to updating the regions of interest that affect operations of the AV to a region of interest reference holder 216, which may be configured to specify the regions of interest that are relevant to the operations of the AV. Additionally or alternatively, the region of interest reference updater 214 may notify the global region of interest reference holder 212 and/or the region of interest reference holder 216 that the surrounding environment of the AV has updated based on the obtained localization information.

In some embodiments, the regions of interest identified by the region of interest reference holder 216 may be obtained by a local region of interest manager 230, which may include a local region of interest updater 232 and/or a multi-lane local region of interest holder 234. The local region of interest updater 232 may be configured to obtain the regions of interest from the region of interest reference holder 216 and/or identify the regions of interest relevant to the operations of a given AV based on the route information and/or localization information corresponding to the AV. Additionally or alternatively, the local region of interest updater 232 may consider one or more mapping elements 206 associated with a map of an area surrounding the AV in identifying the relevant regions of interest, which may facilitate generating a more granular region of interest that includes additional details not captured by the regions of interest as identified by the global region of interest reference manager 210. For example, the local region of interest updater 232 may obtain a given map element that indicates a given region of interest is a convenience store. Based on the given map element, the local region of interest updater 232 may be configured to make an informed and/or accurate categorization of the given region of interest as an area in which object movements may be ignored by the AV. Or stated another way, based on the characterization of a given map element, the given map element may be identified as a negative region of interest. As an additional or alternative example, the local region of interest updater 232 may identify particular road elements, such as bike lanes, walking paths, and/or lane divisions, particular intersection elements, such as crosswalks, traffic control signals, or construction objects, particular peripheral elements, such as sidewalk construction objects, pedestrian crossings, or raised barrier gate arms, some combination thereof, or any other granular details that may or may not be included in the regions of interest as identified by the global region of interest reference manager 210.

In these and other embodiments, the multi-lane local region of interest holder 234 may be configured to store information corresponding to one or more of the regions of interest previously identified as being relevant to making driving decisions by the local region of interest updater 232. The multi-lane local region of interest holder 234 may retrieve and/or output the stored regions of interest without having to generate, determine, or otherwise identify the regions of interest relevant to the current operations of the AV (e.g., for computations by a traffic decider 220 and/or an object decider 250). For example, a given AV may be stopped at an intersection because of a traffic light, and a given region of interest located at the corner of the intersection may be relevant at a first point in time. The given region of interest may also be relevant at a second point in time because the given AV is not moving. Rather than recomputing the boundaries of the given region of interest based on routing information of the AV, localization information of the AV, object predictions in the vicinity of the AV, mapping elements, some combination thereof, or any other upstream computing information, the given region of interest may be sent to the multi-lane local region of interest holder 234 such that the given region of interest may be retrieved and referenced in relation to the operations of the AV at the second point in time even though the given region of interest was determined at the first point in time. In this and other examples, the multi-lane local region of interest holder 234 may be configured to cache regions of interest for a given time frame, over a given distance traveled by the AV, for a given number of computation cycles, or according to any other caching metrics. For example, the multi-lane local region of interest holder 234 may cache a given region of interest for five seconds and/or for a distance of one hundred meters relative to when the given region of interest was identified, whichever occurs later.

In some embodiments, the multi-lane local region of interest holder 234 may be configured to cache one or more concurrent lanes of a roadway on which vehicles may travel in the same direction as individual regions of interest. Caching each concurrent lane as a respective region of interest may facilitate more accurate and/or rapid decision-making by a given AV when the given AV is aiming to navigate into a neighboring lane. Additionally or alternatively, more accurate and/or rapid decision-making may be possible for reacting to other vehicles or objects entering the lane in which the given AV is driving. For example, two adjacent lanes may be designated as left-turn lanes at a given intersection. While a given vehicle is expected to stay within the bounds of either of the two adjacent lanes while executing a left turn, some vehicles may drift into the other of the two adjacent lanes during such a left turn. In this and other examples, the multi-lane local region of interest holder 234 caching each of the two adjacent lanes as separate regions of interests may facilitate more responsive reactions to drifting of other vehicles into the lane in which a given AV implementing the multi-lane local region of interest holder 234 is driving.

In some embodiments, decisions made by the AV may be made based on one or more traffic rules corresponding to the environment in which the AV is driving and/or one or more object rules corresponding to the objects included in the environment within the identified region(s) of interest of the AV such that the AV may make a traffic decision that complies with the identified traffic rules. In some embodiments, a traffic decider 220 may be configured to obtain information from one or more upstream computing systems, such as object-trajectory prediction results from the prediction adapter 203, the vehicle status information from the vehicle status adapter 204, the driving context information from the driving context adapter 205, or some combination thereof, and identify one or more traffic rules applicable to the AV based on the obtained inputs. Additionally or alternatively, the traffic decider 220 may be configured to generate one or more decisions regarding how the AV may be operated to comply with the identified traffic rules. An example of the traffic decider 220 is described in further detail in relation to FIG. 3.

In some embodiments, an object decider 250 may be configured to identify one or more object rules applicable to the AV such that the AV may make an object decision that complies with the identified object rules. The object decider 250 may obtain information from the upstream computing systems relevant to objects included in the environment, such as the object-trajectory prediction results, the route information of the AV, the localization information of the AV, or some combination thereof to facilitate identifying the object rules applicable to the AV. In these and other embodiments, a curve-flattening process or any other processes may be used to normalize the locations and/or the trajectories of the objects included in the environment, and specifically in one or more of the regions of interest of the AV. For example, a spline-based Frenet frame projector 240 may determine one or more vector parameters that represent a curved motion path of a given object, such as a tangent vector, a normal vector, and/or a binormal vector of the given object. Based on the vector parameters determined by the spline-based Frenet frame projector 240, the object decider 250 may make better informed decisions regarding safely operating the AV with respect to any objects in the vicinity of the AV. For example, the object decider 250 may generate a proposed decision of how to operate the AV to comply with the rules associated with the objects in the regions of interest around the AV. An example of the object decider 250 may be described in relation to FIG. 4.

In some circumstances, the AV may make decisions at a high frequency based on rapidly occurring changes in the environment and/or the objects included in the environment. However, making decisions at a high frequency may cause the AV to move irregularly and/or unpredictably. As such, the traffic decision determined by the traffic decider 220, the object decision determined by the object decider 250, and/or any other decisions made by the behavioral decision-making system 200 may be obtained by a decision smoothing manager 270, which may be configured to output one or more smoothed decisions. For example, traffic decision components associated with the traffic decider 220 and/or object decision components associated with the object decider 250 may be output at a first frequency, such as 20 Hz, 30 Hz, 50 Hz, or 100 Hz, and the smoothed decisions may be output at a second frequency slower than the first frequency, such as at 5 Hz or 10 Hz. In some embodiments, the decision smoothing manager 270 may be configured to monitor a frequency of decision-making by the behavioral decision-making system 200 and reduce the frequency of decision-making for the smoothed decisions relative to the decision-making frequency of the object decisions and/or the traffic decisions responsive to determining that the frequency exceeds a predetermined threshold, which may be determined according to user configuration, a machine-learning outcome, computing specifications of the AV, or some combination thereof.

In some embodiments, the decision smoothing manager 270 may be configured to buffer the decisions received from the traffic decider 220 and/or the object decider 250. For example, the decision smoothing manager 270 may store and monitor one or more sets of decisions from the traffic decider 220 and/or the object decider 250 from which the decision smoothing manager 270 may output one or more sets of smoothed decisions.

The smoothed decisions may be sent to a decision merger 280 that is configured to output one behavioral decision that is consistent with the smoothed decisions. In some embodiments, each of the smoothed decisions may be treated as a decision component that is considered as a factor in making a primary behavioral decision for execution by the AV. In these and other embodiments, consideration of the decision components as factors in making the behavioral decision may be facilitated according to a predetermined priority and/or a predetermined importance of each of the decision components. For example, a given traffic decision component may indicate that the AV may continue driving through an intersection because a traffic light displays a green light, and a given object decision component may indicate that the AV may or may not be required to stop because a pedestrian is crossing a crosswalk at the intersection. A given behavioral decision determined based on the given traffic decision component and the given object decision component may prompt the AV to stop before the intersection because the give object decision component involving the pedestrian may have a higher priority than the given traffic decision component relating to traffic-light rules. Additionally or alternatively, object decision components may generally have higher priorities than traffic decision components. In these and other embodiments, the hierarchy and/or priority of rules may prioritize safety of human life, prevention of human injury, avoiding property damage, avoiding damage to the AV or surrounding vehicles, or some combination thereof over orderly and/or efficient travel.

Additionally or alternatively, the decision merger 280 may determine the given behavioral decision according to a simple majority of the traffic decision components, the object decision components, and/or the smoothed decisions (collectively referred to herein as "decision components"). In some embodiments, the decision merger 280 may use a weighted majority of the decision components in which weights applied to each of the decision components may be based on a reliability of a computing system corresponding to the traffic decider 220, the object decider 250, and/or the decision smoothing manager 270, a specific traffic rule and/or object rule associated with the decision components, courses of action associated with the decision components, a safety of the decision components, and/or some combination thereof.

In some embodiments, the behavioral decision output by the decision smoothing manager 270 and/or the decision merger 280 may be used to update a decision history 260. The decision history may include a decision history cache 265 that is configured to store one or more prior behavioral decisions made by the AV and provide the stored behavioral decisions as inputs to the decision smoothing manager 270 without analyzing the decisions according to traffic rules via the traffic decider 220 and/or object rules via the object decider 250. In some embodiments, a given behavioral decision stored in the decision history cache 265 may include information relating to the decision components associated with the given stored behavioral decision such that a behavioral decision to be implemented by the AV may be more quickly determined according to previous behavioral decisions computed under the same or similar circumstances (e.g., similar traffic rules and/or similar object rules) rather than involving computation of the decision based on predetermined priorities relating to the same or similar circumstances.

Modifications, additions, or omissions may be made to the behavioral decision-making system 200 without departing from the scope of the present disclosure. For example, the designations of different elements in the manner described is meant to help explain concepts described herein and is not limiting. For instance, in some embodiments, the global region of interest reference manager 210, the local region of interest manager 230, the traffic decider 220, the object decider 250, the spline-based Frenet frame projector 240, the decision smoothing manager 270, the decision merger 280 and/or the decision history 260 are delineated in the specific manner described to help with explaining concepts described herein but such delineation is not meant to be limiting. Further, the behavioral decision-making system 200 may include any number of other elements or may be implemented within other systems or contexts than those described.

Figure 3:
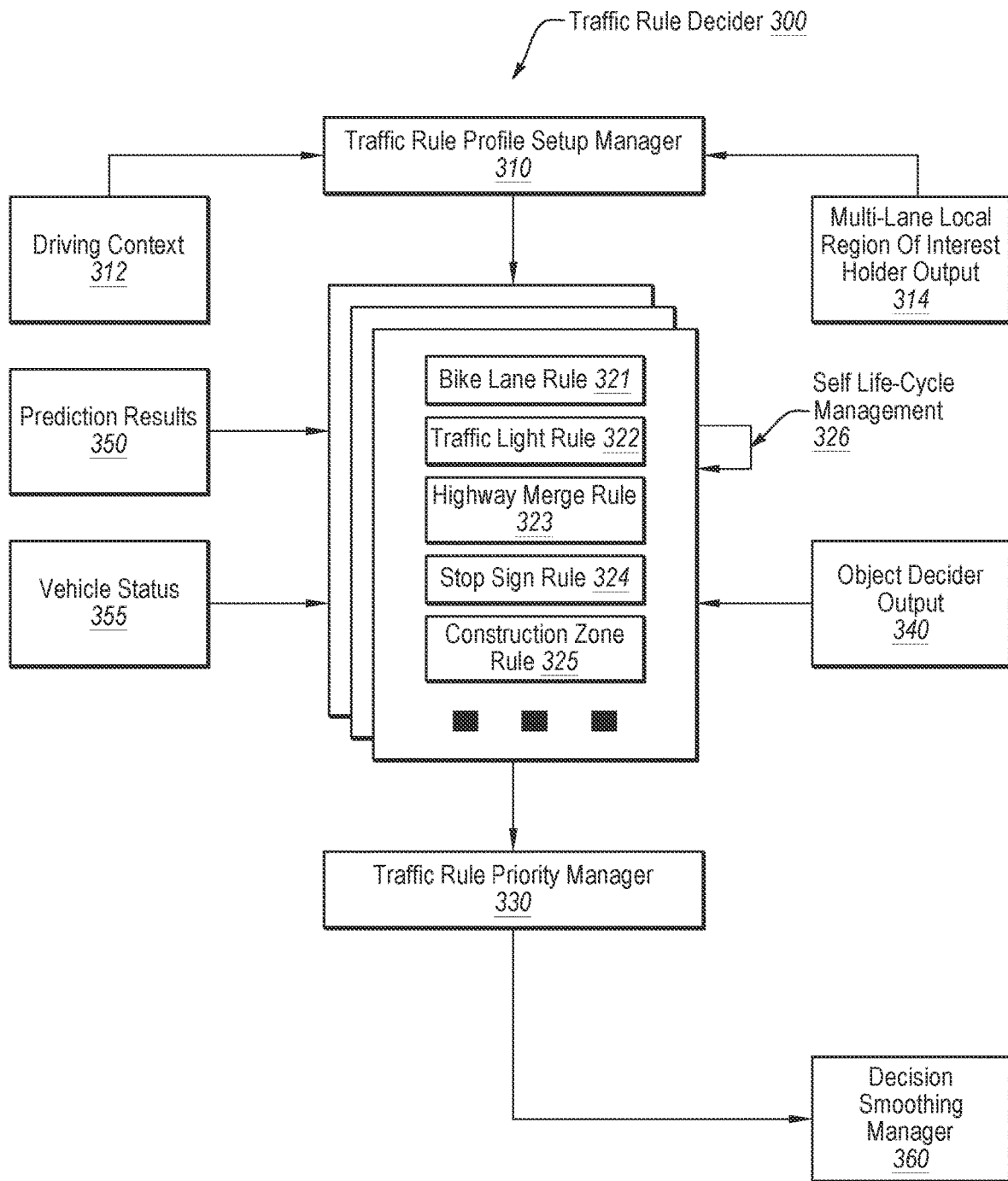
FIG. 3 illustrates an example traffic rule decider system according to at least one embodiment of the present disclosure.

FIG. 3 illustrates an example traffic rule decider system 300 according to at least one embodiment of the present disclosure. The traffic rule decider system 300 may be configured to make one or more traffic decisions according to predetermined rules and/or interests. In some embodiments, the predetermined rules and/or interests may include traffic rules, conventions, best practices, and/or any other behavioral instructions that are determined by a user, a machine-learning process, a default ruleset (e.g., Department of Motor Vehicle (DMV) driving rules), and/or by any other method.

Elements of the traffic rule decider system 300, including, for example, a traffic rule profile setup manager 310, a traffic rule priority manager 330, and/or a decision smoothing manager 360 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to information provided by a driving context 312, a multi-lane local region of interest holder output 314, prediction results 350, a vehicle status 355, and/or an object decider output 340 as described in further detail below in relation to method 800 of FIG. 8 and/or method 900 of FIG. 9.

In some embodiments, the traffic rule decider system 300 may include a traffic rule profile setup manager 310 configured to obtain input information from computing systems associated with the AV and select one or more traffic rule profiles based on the obtained input information. The input information may provide a framework of traffic laws, guidelines, or common practices that the AV should follow. In some embodiments, the input information obtained by the traffic rule profile setup manager 310 may include driving context information 312 that specifies in which country, state, city, or any other area with known societal traffic customs and practices the AV is operating. For example, the driving context information 312 may indicate that the AV is operating in the United States, so the AV should drive on the right side of the road, while driving context information 312 indicating that the AV is operating in the United Kingdoms causes the AV to drive on the left side of the road.

Additionally or alternatively, the traffic rule profile setup manager 310 may obtain multi-lane local region of interest holder outputs 314 to facilitate selection of the traffic rule profiles. The multi-lane local region of interest holder outputs 314 may provide more detailed information regarding traffic rules that may pertain to operations of the AV than the general traffic customs and practices provided by the driving context information 312. In some embodiments, the multi-lane local region of interest holder outputs 314 may provide more detailed or specific context regarding the environment in which the AV is operating. For example, the multi-lane local region of interest holder outputs 314 may include information indicating that the AV is driving on a long, straight roadway, which may be a country road or a highway road. As an additional or alternative example, the multi-lane local region of interest holder outputs 314 may include information indicating that the AV is driving on a short road with many branching turns, which may be a residential neighborhood.

In some embodiments, the traffic rule profile setup manager 310 may identify the traffic rule profiles based on the relevance of the traffic rule profiles to the obtained input information. For example, given multi-lane local region of interest holder outputs 314 may indicate that a given AV is driving in an urban setting. As such, highway merging rules 323 and/or mountain-driving rules may not apply to the given AV, while bike lane rules 321, traffic light rules 322, and/or stop sign rules 324 may be applicable. Consequently, the traffic rule profile setup manager 310 may select the bike lane rules 321, the traffic light rules 322, and/or the stop sign rules 324, while the highway merging rules 323 may not be selected. As an additional or alternative example, the driving context 312 may indicate that the AV is operating in the state of California in the United States, which may have a set of traffic laws and guidelines with which the AV may be expected to comply. Such rules may be different than traffic laws and guidelines in the state of Montana in the United States, which may result in a different traffic profile being selected by the traffic rule profile manager.

In these and other embodiments, the traffic rules applicable to a given set of information corresponding to the driving context 312 and/or the multi-lane local region of interest holder outputs 314 may be refined and identified based on input information obtained by the traffic rule decider system 300. For example, the traffic rule decider system 300 may obtain prediction results 350 and/or information regarding a vehicle status 355 in which the prediction results 350, the vehicle status 355 may be the same as or similar to information provided by the prediction adapter 203 and the vehicle status adapter 204, respectively, of the behavioral decision-making system 200 of FIG. 2.

The traffic rule decider system 300 may determine one or more traffic decisions corresponding to the selected traffic rule profiles. In some embodiments, one traffic decision may be made for each of the selected traffic rule profiles based on the driving context 312 of the AV, a localization of the AV, the specific traffic rules applicable to the selected traffic rule profile, some combination thereof, or any other input information. For example, a given traffic decision may include an instruction to slow down and stop before a red traffic light based on determining that the AV is driving on a public road and approaching an intersection including a traffic light system. In these and other embodiments, the traffic rule decider system 300 may include multiple traffic-decider threads in which each of the traffic-decider threads determines a traffic decision for a specific traffic rule profile. For example, a first traffic-decider thread may determine a traffic decision corresponding to the highway merging rule 323, and a second traffic-decider thread may determine a traffic decision corresponding to a construction zone rule 325.

In some embodiments, the traffic-decider threads may include self-life-cycle management 326 of the selected traffic rule profiles in which the self-life-cycle management 326 includes repetitively determining whether a given traffic rule profile is applicable to the AV and/or the environment around the AV. Each of the traffic rule profiles may include an indication of an estimated effective duration of the associated traffic rules such that the self-life-cycle management 326 may monitor the traffic rules relevant to the AV and/or its surrounding environment and determine when a given traffic rule no longer applies to the AV and/or the environment. For example, a first given traffic rule profile pertaining to a traffic light rule 322 may include a brief estimated duration because the first given traffic rule profile is only applicable when the AV is approaching and/or at an intersection including a traffic light. In this and other examples, the self-life-cycle management 326 may review the applicability of the first given traffic rule profile to the AV after the brief estimated duration and determine whether the AV is still approaching and/or at the intersection. As another example, a second given traffic rule profile pertaining to a speed limit rule may include a long estimated duration because the speed limit rule is applicable for the entire length of a corresponding roadway, and the self-life-cycle management 326 may repeatedly determine that the speed limit rule is relevant until obtaining information indicating otherwise (e.g., driving onto a different road, observing a new speed limit sign, identifying conflicting traffic and/or object rules, etc.). In these and other embodiments, the self-life-cycle management 326 may be configured to update at a user-specified frequency and/or a computationally set frequency. For example, a given traffic rule profile may be considered relevant to the AV for a given distance (e.g., ten meters, fifty meters, one hundred meters, etc.), a given duration (e.g., one hundred milliseconds, one second, two seconds, five seconds, etc.), or some combination thereof before the self-life-cycle management 326 reevaluates the relevance of the given traffic rule profile.

Additionally or alternatively, the self-life-cycle management 326 may obtain one or more object decider outputs 340 and resolve conflicts between the selected traffic rule profiles and the object decider outputs 340. In some embodiments, the object decider outputs 340 may include decisions that affect operations of the AV in response to nearby objects, which may generally take priority over traffic decisions because traffic decisions may be made without consideration and/or without knowledge of objects in the vicinity of the AV. As such, the self-life-cycle management 326 may review the applicability of the selected traffic rule profiles and determine whether each of the selected traffic rule profiles remains applicable to the AV in light of one or more object decider outputs 340.

Because multiple traffic rule profiles may be identified by the traffic rule profile setup manager 310 and the traffic rule decider system 300 may include multiple traffic-decider threads, a corresponding number of traffic decisions may be determined by the traffic rule decider system 300. In some circumstances, one or more of the traffic decisions may conflict and/or directly contrast with one another. For example, a first traffic decision relating to traffic-light rules indicates that the AV can continue driving without stopping for a green light, while a second traffic decision relating to construction-zone rules indicates that the AV must stop and take a detour. In these and other circumstances, the traffic decisions may be ranked according to a predetermined priority.

In some embodiments, a traffic rule priority manager 330 may be configurable by a user and/or a machine-learning process to prioritize traffic decisions and resolve internal conflicts between traffic decisions. Additionally or alternatively, the prioritization by the traffic rule priority manager 330 may be adaptive depending on the driving context. For example, a first given traffic decision associated with a first given traffic rule profile may increase and/or decrease in priority in response to the selection and/or non-selection of a second given traffic rule profile by the traffic rule profile setup manager 310. In circumstances in which two or more traffic decisions conflict with each other, the traffic rule priority manager 330 may be configured to select the higher priority traffic decision and/or omit the lower priority traffic decisions. Additionally or alternatively, the traffic rule priority manager 330 may be configured to include a separate priority ranking for conflicting traffic decisions.

In some embodiments, the traffic decisions output by the traffic rule decider system 300 may be determined with or without consideration of objects in the vicinity (e.g., within a region of interest) of the AV. As such, the traffic decision(s) may be obtained by another computing system before the AV acts upon the traffic decisions. For example, the traffic decisions may be obtained by a decision smoothing manager 360, which may be the same as or similar to the decision smoothing manager 270 as described in relation to the behavioral decision-making system 200 of FIG. 2, to incorporate object decisions, such as the object decider outputs 340, and ensure that decisions are made by the AV at a frequency within a predetermined decision-frequency threshold.

Modifications, additions, or omissions may be made to the traffic rule decider system 300 without departing from the scope of the present disclosure. For example, the designations of different elements in the manner described is meant to help explain concepts described herein and is not limiting. For instance, in some embodiments, the traffic rule profile setup manager 310, the traffic-decider threads, and/or the traffic rule priority manager 330 are delineated in the specific manner described to help with explaining concepts described herein but such delineation is not meant to be limiting. Further, the traffic rule decider system 300 may include any number of other elements or may be implemented within other systems or contexts than those described.

Figure 4:
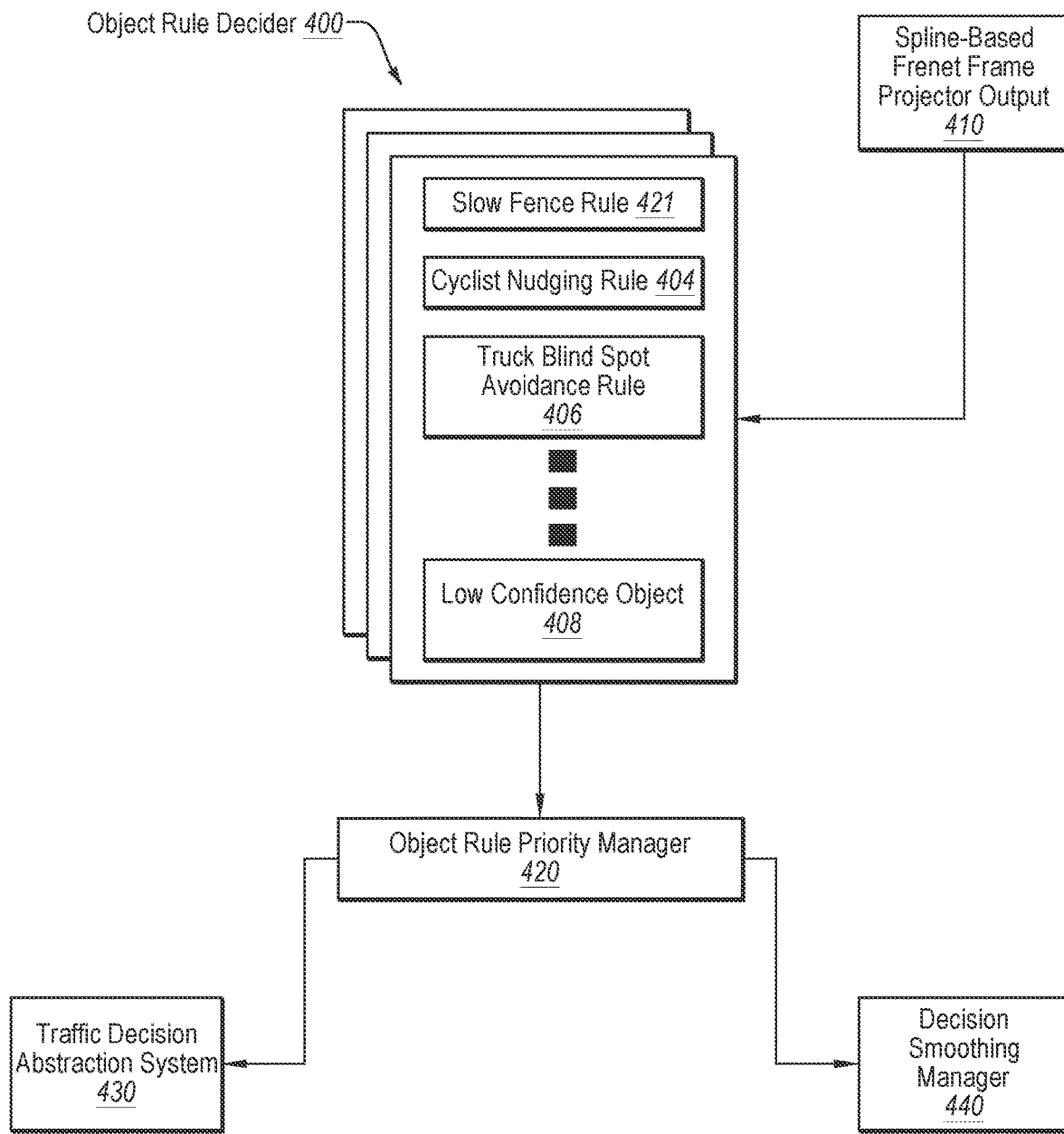
FIG. 4 illustrates an example object rule decider system according to at least one embodiment of the present disclosure.

FIG. 4 illustrates an example object rule decider system 400 according to at least one embodiment of the present disclosure. In some embodiments, the object rule decider system 400 may obtain a spline-based Frenet frame projector output 410, which may be the same as or similar to an object vector output by the spline-based Frenet frame projector 240 of the behavioral decision-making system 200 of FIG. 2. The spline-based Frenet frame projector output 410 may include information describing one or more objects in an environment around the AV (e.g., a location and/or an observed or predicted trajectory of a given object), such as a tangent vector, a normal vector, and/or a binormal vector corresponding to the given object as determined by a curve-flattening process.

Elements of the object rule decider system 400, including, for example, an object rule priority manager 420, a traffic decision abstraction system 430, and/or a decision smoothing manager 440 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to information provided by a spline-based Frenet frame projector output 410 as described in further detail below in relation to method 1000 of FIG. 10.

In some embodiments, the spline-based Frenet frame projector output 410 may be used to identify one or more object-based rules that are relevant to the AV in which the object-based rules may be relevant to the AV because the corresponding objects may be in the vicinity of the AV, predicted to frequently occur in the vicinity of the AV, or for any other reasons. Because the AV may perform specific maneuvers to navigate with respect to some objects, particular objects may involve corresponding object-based rules. For example, a given object may be identified as another vehicle driving on the same road as the AV, so a slow fence rule 402 may be applied to the given object in which the AV may be instructed to decrease its speed upon reaching a fence boundary centered around the given object. As an additional or alternative example, the slow fence rule 402 and/or a cyclist nudging rule 404 may be applied to a given object identified as a cyclist sharing the same road as the AV in which the cyclist nudging rule 404 specifies that the AV should slow down upon approaching the cyclist, safely change lanes, accelerate past the cyclist, and return to the original lane after passing the cyclist by a predetermined distance. As an additional or alternative example, a truck blind spot avoidance rule 406 may specify that the AV should accelerate or decelerate to avoid driving in a lane adjacent to, in front of, and/or behind a given object identified as a large truck, such as an 18-wheeler truck.

As an additional or alternative example, one or more driving instructions may be applied as part of a low-confidence object rule 408 responsive to the object rule decider system 400 or any other computing system failing to positively identify a given object in the vicinity of the AV. In other words, the low-confidence objects may be identified as objects, but a classification of the low-confidence objects may be inconclusive. In these and other examples, the low-confidence object rule 408 may describe one or more object decisions that the AV may make in response to identifying a low-confidence object. The low-confidence object rule 408 may, for example, include an object decision to slow down in response to detecting a moving low-confidence object anywhere in the environment of the AV. As another example, the low-confidence object rule 408 may include an object decision to slow down in response to approaching the low-confidence object.

While some examples of rules are provided, it will be appreciated that any number of rules associated with any number of objects or classes of objects are contemplated within the scope of the present disclosure.

In some embodiments, the object rule decider system 400 may identify the objects included in the environment based on the obtained input information and determine which object rules are applicable to the AV according to the identified objects. For example, the object rule decider system 400 may identify the objects included in the environment as any input information greater than a predetermined size threshold (e.g., taller than thirty centimeters, wider than fifty centimeters, having a volume greater than one thousand cubic centimeters, etc.) that is not part of the environment (e.g., part of the road). In these and other embodiments, the object identification criteria may be designated by an operator of the AV, a developer/programmer of the AV, any other user associated with the AV, automatically generated by the AV itself, and/or combinations thereof. In these and other embodiments, the input may include a list of objects, location of the objects, size of the objects, some combination thereof, or any other properties relating to the physical properties of the objects. Additionally or alternatively, the identification of the objects may be performed by an upstream computer system, such as the prediction system 110 as described in relation to the autonomous driving system 100 of FIG. 1, and the identified objects may be obtained as input information by the object rule decider system 400.

In some embodiments, an object rule priority manager 420 may be configurable by a user and/or a machine-learning process to prioritize object-based decisions and resolve any conflicts between multiple proposed object-based decisions. Additionally or alternatively, the prioritization by the object rule priority manager 420 may be adaptive depending on the driving context. For example, a first given object-based decision associated with a first given object rule may increase and/or decrease in priority in response to the presence and/or absence of a second given object rule. In circumstances in which two or more object-based decisions (e.g., proposed courses of action based on a given rule) conflict with each other, the object rule priority manager 420 may be configured to select the higher priority object decision and/or omit the lower priority object decisions. Additionally or alternatively, the object rule priority manager 420 may be configured to include a separate priority ranking for conflicting object decisions.

Additionally or alternatively, the object rule priority manager 420 may be configured to comply with multiple object-based decisions that are not mutually exclusive. For example, the object rule priority manager 420 may identify a highest priority object-based decision and may discard any other object-based decisions that are inconsistent with the highest priority object-based decision while modifying the highest priority object-based decision to include other object-based decisions that are not inconsistent with the highest priority object-based decision. For example, the highest priority object-based decision may indicate that a vehicle is to slow and stop within forty feet due to a detected pedestrian, while a backing vehicle rule may indicate that the vehicle is to slow and stop within twenty feet due to another vehicle backing up, both of which may be complied with while satisfying the highest priority object-based decision.

In some circumstances, the decisions made by the AV in response to objects in its environment may change depending on the particular environment in which the AV is situated. For example, the AV may avoid driving into truck blind spots in highway environments, but the AV may not need to avoid driving into the truck blind spots in a parking lot environment (e.g., when a truck is parked). To account for changes in the object-based decisions to be made by the object rule decider system 400, driving context information, environmental context information, some combination thereof, or any other input information obtained from an upstream computer system may be combined with and/or considered alongside the object-based decisions. In some embodiments, the object-based decisions may be output by the object rule priority manager 420 to one or more downstream computing systems to facilitate overall decision-making by the AV. For example, the object-based decisions may be output to a decision smoothing manager 440, which may be the same as or similar to the decision smoothing manager 270 of the behavioral decision-making system 200 or the decision smoothing manager 360 of the traffic rule decider system 300, and/or a traffic decision abstraction system 430, which may be the same as or similar to the traffic decider 220 of the behavioral decision-making system 200 or the traffic rule decider system 300.

Modifications, additions, or omissions may be made to the object rule decider system 400 without departing from the scope of the present disclosure. For example, the designations of different elements in the manner described is meant to help explain concepts described herein and is not limiting. For instance, in some embodiments, the spline-based Frenet frame projector output 410, the traffic-decider threads, and/or the object rule priority manager 420 are delineated in the specific manner described to help with explaining concepts described herein but such delineation is not meant to be limiting. Further, the object rule decider system 400 may include any number of other elements or may be implemented within other systems or contexts than those described.

Figure 5:
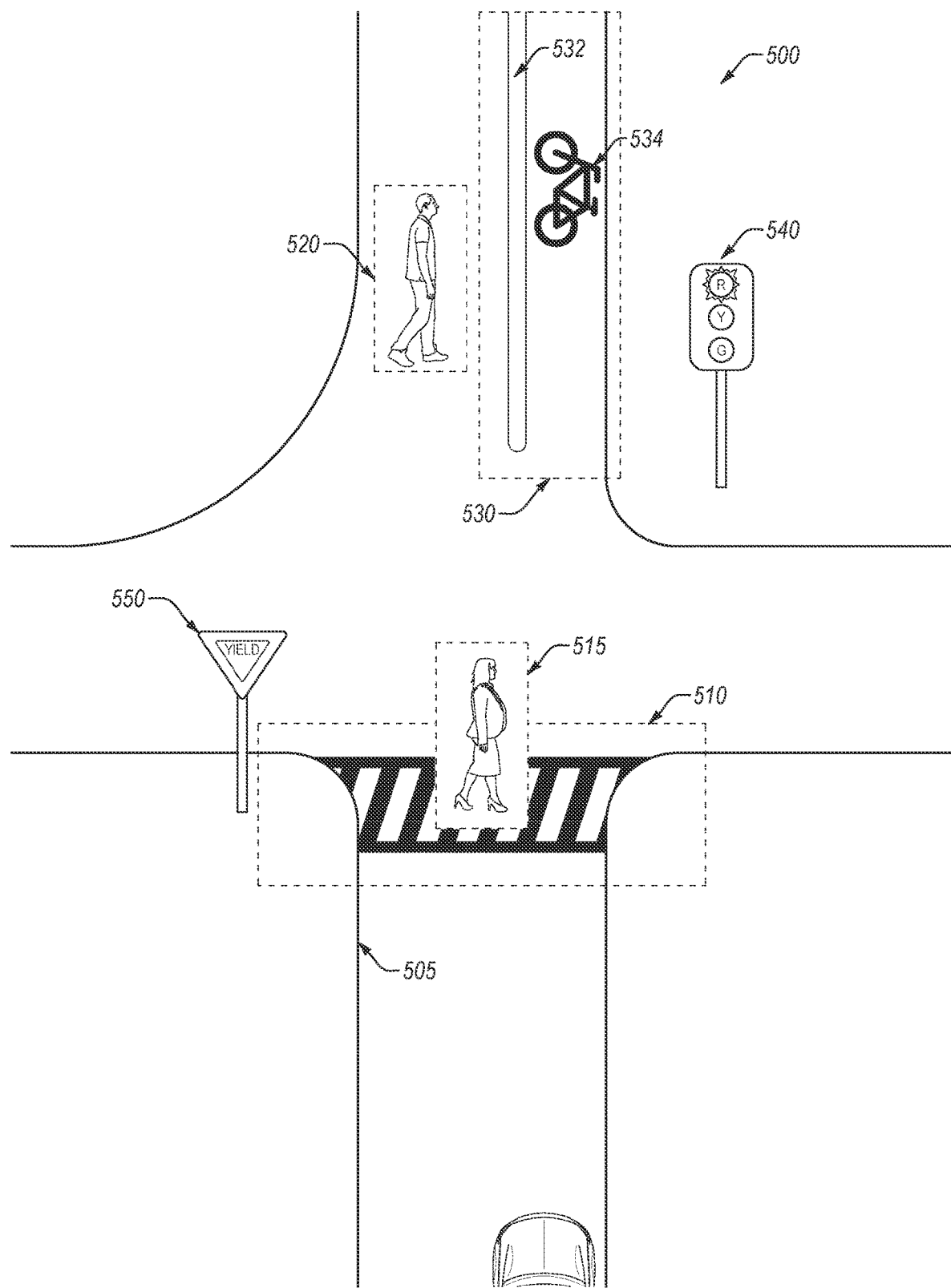
FIG. 5 illustrates a first example of a frame of operation that implements the behavioral decision-making system according to at least one embodiment of the present disclosure.

FIG. 5 illustrates a first example of a frame of operation 500 that implements a behavioral decision-making system according to at least one embodiment of the present disclosure. As illustrated, the frame of operation 500 may depict a human-interpretable representation of an environment in which a given AV may operate, such as a road-crossing in an urban setting. The frame of operation 500 may include road boundaries 505 that delineate one or more roads on which the given AV may drive. In front of the AV, a crosswalk 510 may be displayed on the surface of one or more of the roads between two or more road boundaries 505, and a first pedestrian 515 may traverse the road by walking over the crosswalk 510. Additionally or alternatively, a second pedestrian 520 may be observed traversing the road by walking over a section of the road that is not proximate to the crosswalk 510. The frame of operation 500 may include a bike lane 530, which may be separated from the rest of the road by a bike lane boundary 532, and the bike lane 530 may be marked and identified by a bike lane symbol 534 displayed on the surface of the bike lane 530. Additionally or alternatively, a biker (not shown) may be riding a bicycle within the bike lane 530. The frame of operation 500 may include traffic signage, such as a traffic control light 540 and/or a traffic control sign 550.

The given AV may be configured to identify one or more regions of interest which are visualized and demarcated in the frame of operation 500 by the dashed boxes around the crosswalk 510, the first pedestrian 515, the second pedestrian 520, and the bike lane 530. Additionally or alternatively, regions of interest may be marked with respect to the traffic control light 540 and/or the traffic control sign 550 (not illustrated). In some embodiments, the given AV may identify particular regions of interest as positive regions of interest in which the given AV pays attention to objects or other occurrences within the positive regions of interest or as negative regions of interest in which the given AV ignores or discounts objects or other occurrences within the negative regions of interest. For example, the regions of interest including the crosswalk 510, the first pedestrian 515, and/or the second pedestrian 520 may be representative of positive regions of interest because the given AV may drive through the areas occupied by the crosswalk 510, the first pedestrian 515, and/or the second pedestrian 520. However, the region of interest corresponding to the bike lane 530 may represent a negative region of interest because the given AV may determine that the bike lane 530 is a section of the road through which the given AV will not drive.

Figure 6:
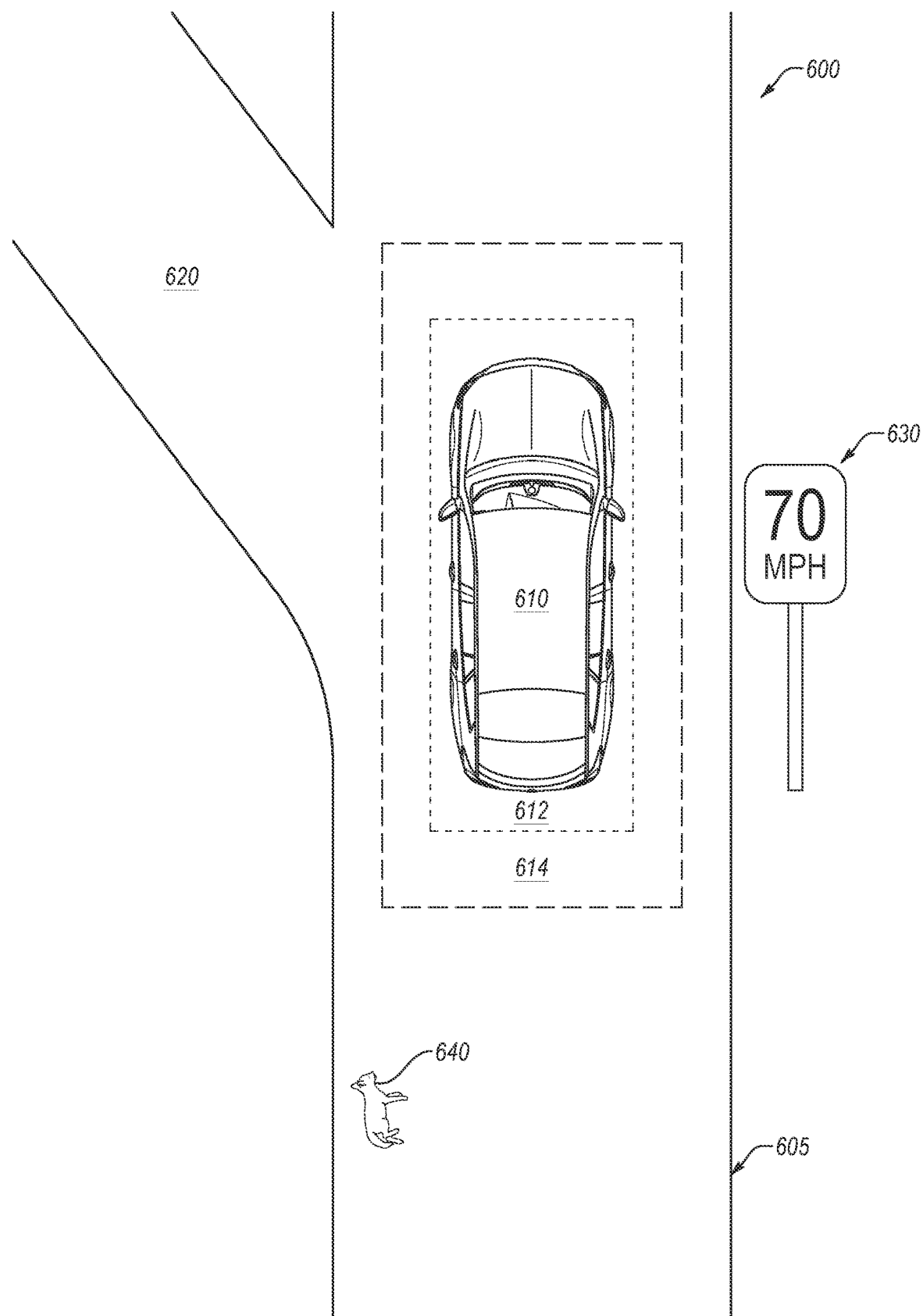
FIG. 6 illustrates a second example of a frame of operation that implements the behavioral decision-making system according to at least one embodiment of the present disclosure.

FIG. 6 illustrates a second example of a frame of operation 600 that implements a behavioral decision-making system according to at least one embodiment of the present disclosure. The frame of operation 600 may depict a human-interpretable representation of an environment in which a given AV may operate, such as a public roadway that feeds into a highway traffic system. The frame of operation 600 may include road boundaries 605 that demarcate the public roadway and a branching roadway that is a highway on-ramp 620. The frame of operation 600 may include a third-party vehicle 610 that is driving in front of the given AV. The third-party vehicle 610 may be categorized as an object that involves object rules pertaining to how the given AV is to operate in the vicinity of the third-party vehicle 610. For example, a first object rule involving other vehicles on a road may include a braking rule in which the given AV is to be instructed to brake within a first distance to the third-party vehicle 610 as represented by a braking zone 612. As an additional or alternative example, a second object rule may include a slowing rule in which the given AV is to be instructed to reduce its speed within a second distance, which may be longer than the first distance associated with the braking zone, to the third-party vehicle 610 as represented by a slowing zone 614.

Additionally or alternatively, the frame of operation may include traffic signage, such as a speed limit sign 630 along the side of the road and/or an unidentified object 640. Although a human viewing the frame of operation 600 may be capable of identifying the unidentified object 640 (e.g., as a cardboard box, a piece of furniture, a tumbleweed, or any other object), the given AV may not be configured to accurately label the unidentified object 640. In some embodiments, the given AV may be configured to apply a braking rule and/or a slowing rule with respect to the unidentified object 640 and a projected trajectory and/or path of motion of the unidentified object 640. In these and other embodiments, a braking zone and/or a slowing zone corresponding to the unidentified object 640 may be larger than the braking zone 612 and/or the slowing zone 614 to account for variability or uncertainties in the identity of the unidentified object 640.

Figure 7:
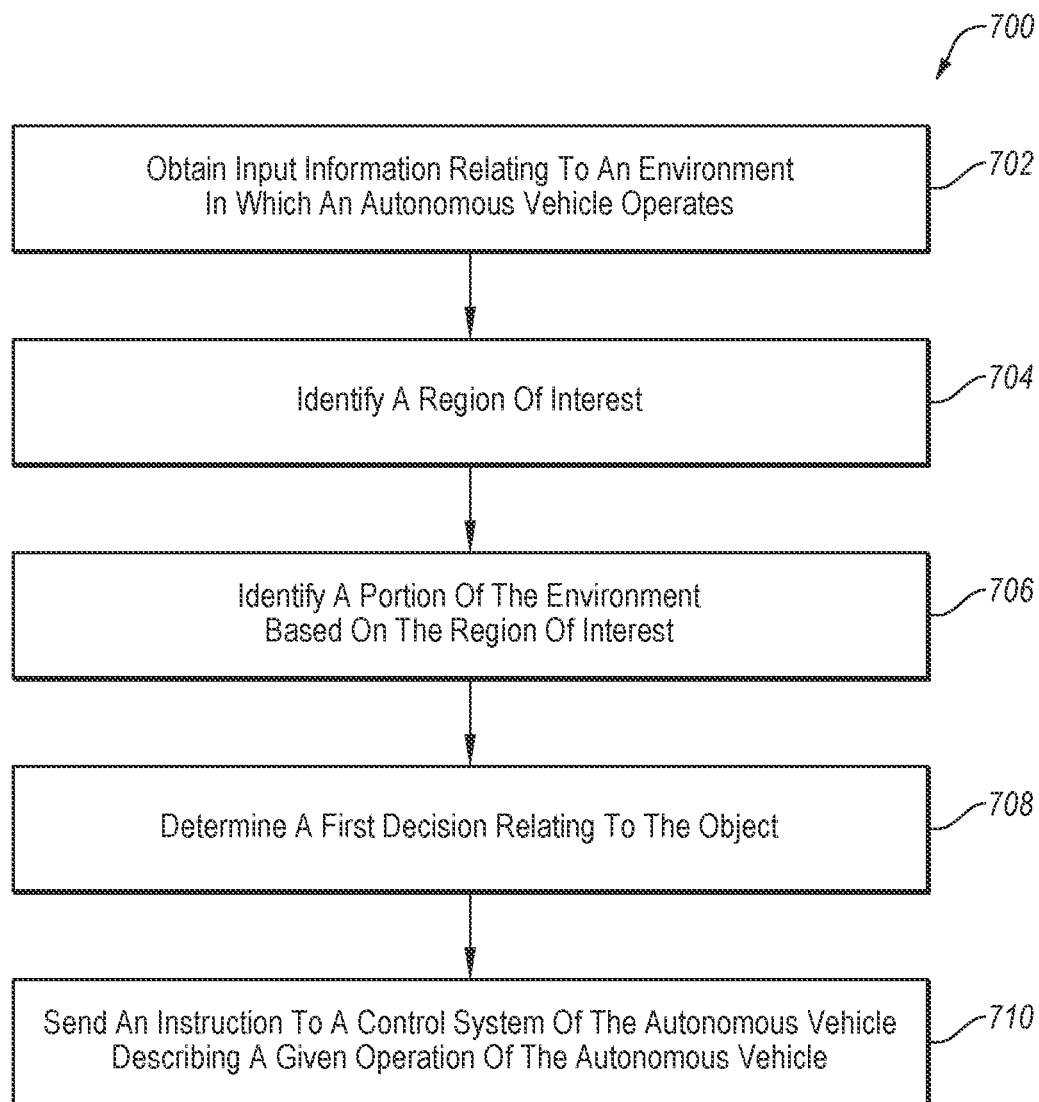
FIG. 7 is a flowchart of an example method of performing behavioral decision-making for an autonomous vehicle according to at least one embodiment of the present disclosure.

FIG. 7 is a flowchart of an example method 700 of performing behavioral decision-making for an AV according to at least one embodiment of the present disclosure. The method 700 may be performed by any suitable system, apparatus, or device. For example, the global region of interest reference manager 210, the local region of interest manager 230, the traffic decider 220, the object decider 250, the spline-based Frenet frame projector 240, the decision smoothing manager 270, the decision merger 280 and/or the decision history 260 of the behavioral decision-making system 200 of FIG. 2 may perform one or more operations associated with the method 700. Although illustrated with discrete blocks, the steps and operations associated with one or more of the blocks of the method 700 may be divided into additional blocks, combined into fewer blocks, or eliminated, depending on the particular implementation.

The method 700 may begin at block 702, where input information relating to an environment in which an AV operates may be obtained. In some embodiments, the input information may describe a state of the AV, one or more operations performed by the AV within the environment, a property of the environment around the AV, an object included in the environment around the AV, some combination thereof, or any other information that may or may not be related to driving of the AV within its surrounding environment.

At block 704, a region of interest may be identified based on the input information. The region of interest may represent a section of the environment. In some embodiments, identifying the region of interest may include performing the steps associated with method 800 as described in relation to FIG. 8.

At block 706, a portion of the environment may be identified based on the region of interest. In some embodiments, the portion of the environment may include an object that affects operations of the AV. For example, the object may include one or more of the objects that the object decider 250 of the behavioral decision-making system 200 analyzes. As an additional or alternative example, the object may include a traffic object that provides information about a traffic rule relating to the environment or the operation of the AV, such as the traffic rules analyzed by the traffic decider 220 of the behavioral decision-making system 200. In some embodiments, the portion of the environment may be the region of interest. Additionally or alternatively, the portion of the environment may exclude the region of interest and instead include the area covered by the rest of the environment.

At block 708, a first decision relating to the object as described at block 706 may be determined. In some embodiments, the first decision may include a decision based on some or all of the objects from some or all of the portions of the environment.

At block 710, an instruction may be sent to a control system of the AV in which the instruction describes a given operation of the AV. Based on the instruction, the control system may cause the AV to perform one or more maneuvers to produce the given operation. For example, the given operation may involve navigating around a roundabout, and the maneuvers directed by the control system may sequentially include decreasing a speed of the AV, steering the AV in a first direction for a first period of time, and steering the AV in a second direction for a second period of time. As an additional or alternative example, the given operation may involve more granular navigation instructions, such as continuing to maintain acceleration at a given rate for a given duration, steering in a given direction at a given angle for a given duration, implementing a turn signal for a given duration before steering in a given direction at a given angle for a given duration, some combination thereof, or any other navigation instructions.

Modifications, additions, or omissions may be made to the method 700 without departing from the scope of the disclosure. For example, the designations of different elements in the manner described is meant to help explain concepts described herein and is not limiting. Further, the method 700 may include any number of other elements or may be implemented within other systems or contexts than those described.

Figure 8:
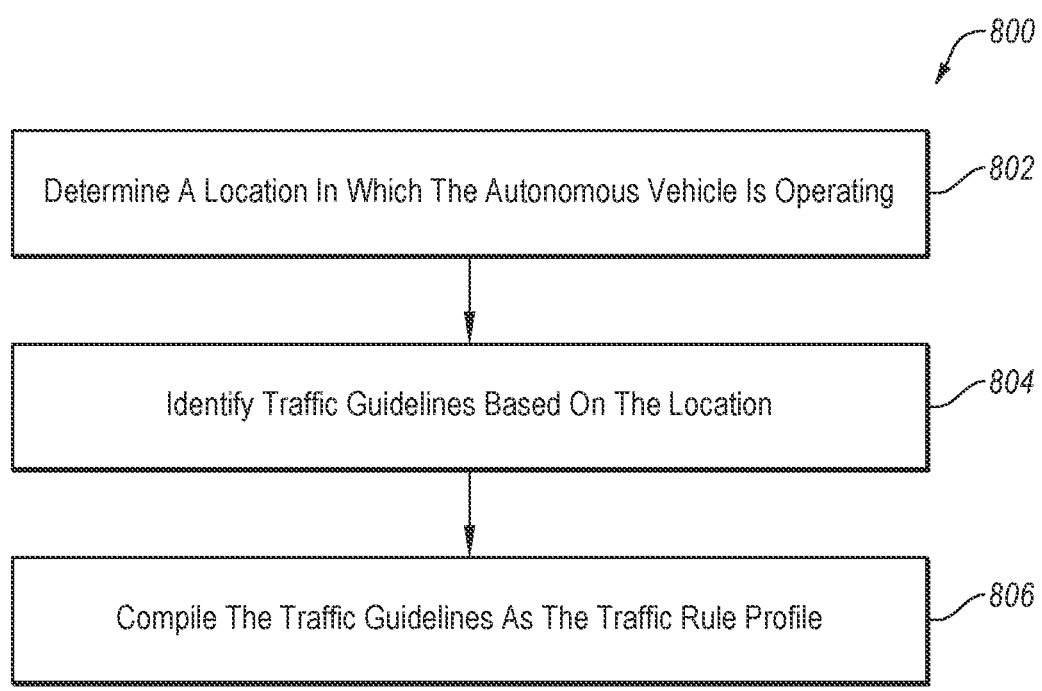
FIG. 8 is a flowchart of an example method of generating a traffic rule profile according to at least one embodiment of the present disclosure.

FIG. 8 is a flowchart of an example method 800 of generating a traffic rule profile according to at least one embodiment of the present disclosure. The method 800 may be performed by any suitable system, apparatus, or device. For example, the traffic rule profile setup manager 310, the traffic-decider threads, and/or the traffic rule priority manager 330 of the traffic rule decider system 300 of FIG. 3 may perform one or more operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, where a location in which an AV is operating may be determined. In some embodiments, the location of the AV may be determined using driving context information (e.g., the driving context 312 as described in relation to the traffic rule decider system 300), localization information, vehicle status information, some combination thereof, or any other information about the AV as obtained from upstream computer systems.

At block 804, traffic guidelines may be identified based on the identified location. In some embodiments, the traffic guidelines may include traffic laws and/or common practices relating to the location in which the AV operates. Additionally or alternatively, the traffic guidelines may involve more localized traffic guidelines relating to traffic control signals and/or traffic signs in the environment in which the AV operates, which may be provided based on the multi-lane local region of interest holder output 314 as described in relation to the traffic rule decider system 300.

At block 806, the traffic guidelines may be compiled as a traffic rule profile. The traffic rule profile may include one or more traffic rules, such as the bike lane rule 321, the traffic light rule 322, the highway merge rule 323, the stop sign rule 324, the construction zone rule 325, or any other rules as described in relation to the traffic rule decider system 300.

Modifications, additions, or omissions may be made to the method 800 without departing from the scope of the disclosure. For example, the designations of different elements in the manner described is meant to help explain concepts described herein and is not limiting. Further, the method 800 may include any number of other elements or may be implemented within other systems or contexts than those described.

Figure 9:
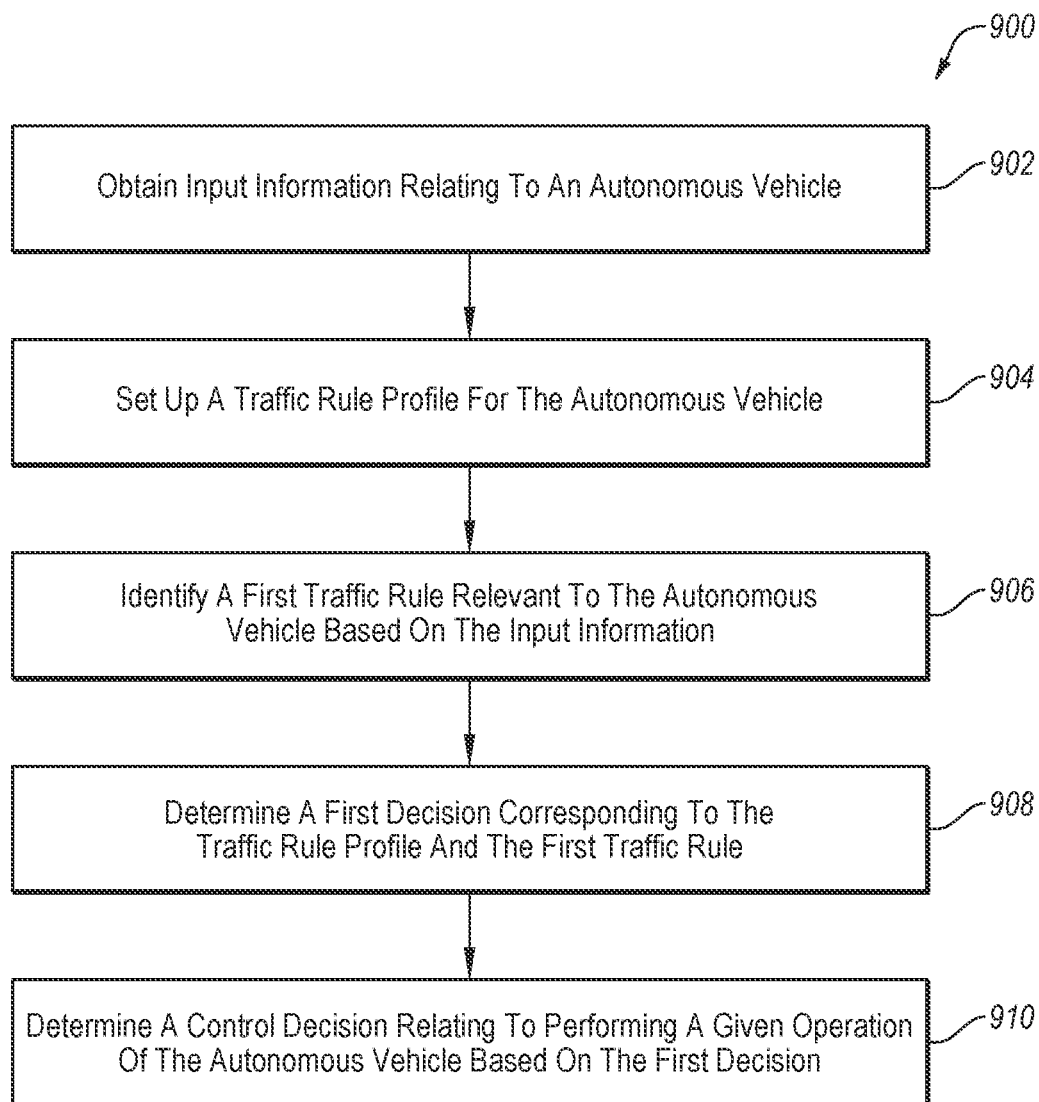
FIG. 9 is a flowchart of an example method of making a control decision based on one or more traffic rules according to at least one embodiment of the present disclosure.

FIG. 9 is a flowchart of an example method 900 of making a control decision based on one or more traffic rules according to at least one embodiment of the present disclosure. The method 900 may be performed by any suitable system, apparatus, or device. For example, the traffic rule profile setup manager 310, the traffic-decider threads, and/or the traffic rule priority manager 330 of the traffic rule decider system 300 of FIG. 3 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

The method 900 may begin at block 902, where input information relating to a given AV may be obtained. In some embodiments, the input information may describe a state of the AV, one or more operations performed by the AV within the environment, a property of the environment around the AV, an object included in the environment around the AV, some combination thereof, or any other information that may or may not be related to driving of the AV within its surrounding environment.

At block 904, a traffic rule profile for the given AV may be set up. The traffic rule profile may specify societal traffic practices corresponding to a location of the environment in which the AV operates. For example, a given societal traffic practice may indicate that the given AV should drive using the right side of the road while operating in the United States, while operating the given AV in the United Kingdoms involves driving on the left side of the road. As an additional or alternative example, it may be determined that the given AV is operating in the state of California in the United States, which may have a set of traffic laws and guidelines with which the AV may be expected to generally comply. Such rules may be different than traffic laws and guidelines in the state of Montana in the United States, which may result in a different traffic profile being selected by the traffic rule profile manager. In some embodiments, the traffic rule profile may be set up according to the operations associated with the method 800.

At block 906, a first traffic rule relevant to the given AV may be identified based on the obtained input information. In some embodiments, the first traffic rule may include the bike lane rule 321, the traffic light rule 322, the highway merge rule 323, the stop sign rule 324, the construction zone rule 325, some combination thereof, or any other traffic rules as described in relation to the traffic rule decider system 300 of FIG. 3.

At block 908, a first decision corresponding to the traffic rule profile and the first traffic rule may be determined. In some embodiments, a second decision corresponding to the traffic rule profile and a second traffic rule may also be determined, and a third decision that considers the first decision and the second decision may be made. To make the third decision, the first and the second traffic rules may be ranked in a priority order because the first decision and the second decision may or may not result in conflicting operations being performed by the given AV. The priority order of the traffic rules may be adaptive with respect to the driving context of the given AV. For example, a priority associated with the first traffic rule may increase or decrease depending on what the second traffic rule entails. In circumstances in which the first decision and the second decision may result in conflicting operations being performed by the given AV, the decision having the higher priority may be selected while the decision having the lower priority is omitted.

At block 910, a control decision relating to performing a given operation of the given AV may be determined based on the first decision. Based on the instruction, the control system may cause the AV to perform one or more maneuvers to produce the given operation. For example, the given operation may involve navigating around a roundabout, and the maneuvers directed by the control system may sequentially include decreasing a speed of the AV, steering the AV in a first direction for a first period of time, and steering the AV in a second direction for a second period of time. As an additional or alternative example, the given operation may involve more granular navigation instructions, such as continuing to maintain acceleration at a given rate for a given duration, steering in a given direction at a given angle for a given duration, implementing a turn signal for a given duration before steering in a given direction at a given angle for a given duration, some combination thereof, or any other navigation instructions.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
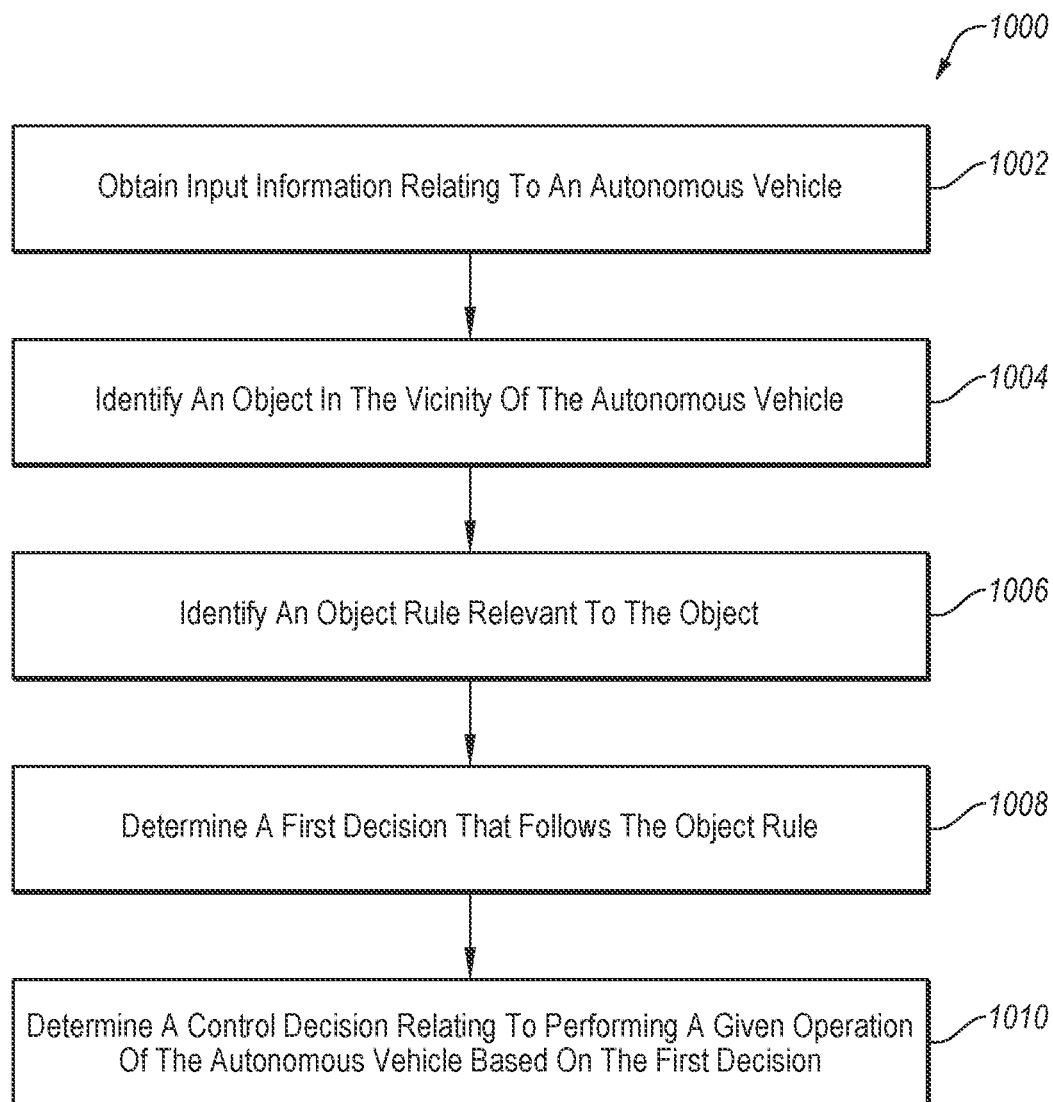
FIG. 10 is a flowchart of an example method of making a control decision based on one or more object rules according to at least one embodiment of the present disclosure.

FIG. 10 is a flowchart of an example method 1000 of making a control decision based on one or more traffic rules according to at least one embodiment of the present disclosure. The method 1000 may be performed by any suitable system, apparatus, or device. For example, the spline-based Frenet frame projector output 410, the traffic-decider threads, and/or the object rule priority manager 420 of the object rule decider system 400 of FIG. 4 may perform one or more operations associated with the method 1000. Although illustrated with discrete blocks, the steps and operations associated with one or more of the blocks of the method 1000 may be divided into additional blocks, combined into fewer blocks, or eliminated, depending on the particular implementation.

The method 1000 may begin at block 1002, where input information relating to an AV may be obtained. In some embodiments, the input information may describe a state of the AV, one or more operations performed by the AV within the environment, a property of the environment around the AV, an object included in the environment around the AV, some combination thereof, or any other information that may or may not be related to driving of the AV within its surrounding environment.

At block 1004, an object in the vicinity of the AV may be identified based on the obtained input information. In some embodiments, the object may involve input information greater than a predetermined size threshold (e.g., taller than thirty centimeters, wider than fifty centimeters, having a volume greater than one thousand cubic centimeters, etc.) that is not part of the environment (e.g., part of the road) in which the predetermined size threshold may be set by may be designated by an operator of the AV, a developer/programmer of the AV, any other user associated with the AV, automatically generated by the AV itself, and/or combinations thereof. Additionally or alternatively, the identification of the objects may be performed by an upstream computer system, such as the prediction system 110 as described in relation to the autonomous driving system 100 of FIG. 1.

At block 1006, an object rule corresponding to the object may be determined. In some embodiments, the object rule may indicate suggested driving behavior for the AV to interact with the object safely and effectively with respect to operation of the AV. For example, the object rule may include the slow fence rule 402, the cyclist nudging rule 404, the truck blind spot avoidance rule 406, the low confidence object rule 408, some combination thereof, or any other object rules as described in relation to the object rule decider system 400.

At block 1008, a first decision that follows the object rule may be determined. The first decision may include an operation that the given AV may perform that allows the given AV to adhere to the object rule. In some embodiments, a second decision corresponding to the a second object rule may also be determined, and a third decision that considers the first decision and the second decision may be made. To make the third decision, the first and the second object rules may be ranked in a priority order because the first decision and the second decision may or may not result in conflicting operations being performed by the given AV. The priority order of the object rules may be adaptive with respect to the driving context of the given AV. For example, a priority associated with the first object rule may increase or decrease depending on what the second object rule entails. In circumstances in which the first decision and the second decision may result in conflicting operations being performed by the given AV, the decision having the higher priority may be selected while the decision having the lower priority is omitted.

At block 1010, a control decision relating to performing a given operation of the AV may be determined based on the first decision. Based on the instruction, the control system may cause the AV to perform one or more maneuvers to produce the given operation. For example, the given operation may involve navigating around a roundabout, and the maneuvers directed by the control system may sequentially include decreasing a speed of the AV, steering the AV in a first direction for a first period of time, and steering the AV in a second direction for a second period of time. As an additional or alternative example, the given operation may involve more granular navigation instructions, such as continuing to maintain acceleration at a given rate for a given duration, steering in a given direction at a given angle for a given duration, implementing a turn signal for a given duration before steering in a given direction at a given angle for a given duration, some combination thereof, or any other navigation instructions.

Modifications, additions, or omissions may be made to the method 1000 without departing from the scope of the disclosure. For example, the designations of different elements in the manner described is meant to help explain concepts described herein and is not limiting. Further, the method 1000 may include any number of other elements or may be implemented within other systems or contexts than those described.

Figure 11:
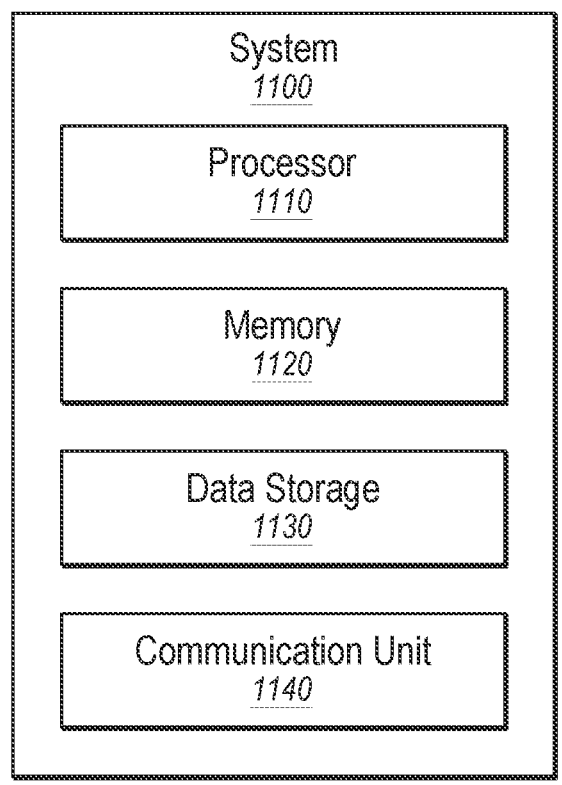
FIG. 11 is an example computing system.

FIG. 11 illustrates an example computing system 1100, according to at least one embodiment described in the present disclosure. The computing system 1100 may include a processor 1110, a memory 1120, a data storage 1130, and/or a communication unit 1140, which all may be communicatively coupled. Any or all of the behavioral decision-making system 200 of FIG. 2 may be implemented as a computing system consistent with the computing system 1100, including the global region of interest reference manager 210, the local region of interest manager 230, the traffic decider 220, the object decider 250, the spline-based Frenet frame projector 240, the decision smoothing manager 270, the decision merger 280 and/or the decision history 260.

Generally, the processor 1110 may include any suitable special-purpose or general-purpose computer, computing entity, or processing device including various computer hardware or software modules and may be configured to execute instructions stored on any applicable computer-readable storage media. For example, the processor 1110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, it is understood that the processor 1110 may include any number of processors distributed across any number of network or physical locations that are configured to perform individually or collectively any number of operations described in the present disclosure. In some embodiments, the processor 1110 may interpret and/or execute program instructions and/or process data stored in the memory 1120, the data storage 1130, or the memory 1120 and the data storage 1130. In some embodiments, the processor 1110 may fetch program instructions from the data storage 1130 and load the program instructions into the memory 1120.

After the program instructions are loaded into the memory 1120, the processor 1110 may execute the program instructions, such as instructions to perform operations associated with the global region of interest reference manager 210, the local region of interest manager 230, the traffic decider 220, the object decider 250, the spline-based Frenet frame projector 240, the decision smoothing manager 270, the decision merger 280 and/or the decision history 260.

The memory 1120 and the data storage 1130 may include computer-readable storage media or one or more computer-readable storage mediums for having computer-executable instructions or data structures stored thereon. Such computer-readable storage media may be any available media that may be accessed by a general-purpose or special-purpose computer, such as the processor 1110. For example, the memory 1120 and/or the data storage 1130 may store information provided by the route adapter 201, the localization adapter 202, the prediction adapter 203, the vehicle status adapter 204, and/or the driving context adapter 205. As an additional or alternative example, the memory 1120 and/or the data storage 1130 may store the mapping elements 206, the traffic decision components, the object decision components, the smoothed decisions, and/or the outputted decision. In some embodiments, the computing system 1100 may or may not include either of the memory 1120 and the data storage 1130.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1110 to perform a certain operation or group of operations.

The communication unit 1140 may include any component, device, system, or combination thereof that is configured to transmit or receive information over a network. In some embodiments, the communication unit 1140 may communicate with other devices at other locations, the same location, or even other components within the same system. For example, the communication unit 1140 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1140 may permit data to be exchanged with a network and/or any other devices or systems described in the present disclosure. For example, the communication unit 1140 may allow the system 1100 to communicate with other systems, such as computing devices and/or other networks.

One skilled in the art, after reviewing this disclosure, may recognize that modifications, additions, or omissions may be made to the system 1100 without departing from the scope of the present disclosure. For example, the system 1100 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining input information relating to an environment in which an autonomous vehicle (AV) operates, the input information describing a geographical location in which the AV operates, a framework of traffic guidelines associated with the geographical location, and a configuration of roads in a vicinity of the AV;
    setting up a traffic rule profile for the AV that specifies legal traffic practices corresponding to the geographical location in which the AV operates and the framework of traffic guidelines that the AV follows in the geographical location, the legal traffic practices differing according to a country, a state, or a city associated with the geographical location;
    identifying a first traffic rule that applies to the AV based on the traffic rule profile and the configuration of the roads in the vicinity of the AV;
    using a machine-learning process to prioritize traffic decisions made in relation to the identified traffic rule and the traffic rule profile and resolve internal conflicts between the traffic decisions;
    adaptively prioritizing the traffic decisions based on a driving context so that a first traffic decision associated with a first traffic rule profile increases or decreases in priority in response to a selection or non-selection of other traffic rule profiles, wherein a separate priority ranking for conflicting traffic decisions is performed in response to two or more traffic decisions conflicting with each other;
    determining a first driving decision that adheres to the identified first traffic rule and the legal traffic practices specified by the traffic rule profile;
    sending a first instruction to a control system of the AV, the first instruction describing a first operation of the AV according to the first driving decision; and
    controlling at least one vehicular system of the AV according to the first instruction such that the first operation accounts for the first driving decision.

2. The method of claim 1, further comprising:
    identifying a second traffic rule relevant to the AV based on the traffic rule profile; and
    determining a third driving decision based on the first driving decision and a second driving decision corresponding to the second traffic rule, wherein the first instruction describing the first operation of the AV is further based on the third driving decision.

3. The method of claim 2, wherein the third driving decision results in the first operation of the AV satisfying the first driving decision and the second driving decision.

4. The method of claim 2, wherein the third driving decision results in the first operation of the AV satisfying only the first driving decision or only the second driving decision according to a priority order.

5. The method of claim 1, wherein the first traffic rule includes at least one of: a bike lane rule, a traffic light rule, a highway merge rule, a stop sign rule, or a construction zone rule.

6. The method of claim 1, wherein setting up the traffic rule profile for the AV includes:
    identifying the legal traffic practices associated with the geographical location; and
    compiling the legal traffic practices as the traffic rule profile.

7. A non-transitory computer-readable storage medium configured to store instructions that, in response to being executed, cause one or more processors to perform operations, the operations comprising:
    obtaining input information relating to an environment in which an autonomous vehicle (AV) operates, the input information describing a geographical location in which the AV operates, a framework of traffic guidelines associated with the geographical location, and a configuration of roads in a vicinity of the AV;
    setting up a traffic rule profile for the AV that specifies legal traffic practices corresponding to the geographical location in which the AV operates and the framework of traffic guidelines that the AV follows in the geographical location, the legal traffic practices differing according to a country, a state, or a city associated with the geographical location;
    identifying a first traffic rule that applies to the AV based on the traffic rule profile and the configuration of the roads in the vicinity of the AV;
    using a machine-learning process to prioritize traffic decisions made in relation to the identified traffic rule and the traffic rule profile and resolve internal conflicts between the traffic decisions;
    adaptively prioritizing the traffic decisions based on a driving context so that a first traffic decision associated with a first traffic rule profile increases or decreases in priority in response to a selection or non-selection of other traffic rule profiles, wherein a separate priority ranking for conflicting traffic decisions is performed in response to two or more traffic decisions conflicting with each other;
    determining a first driving decision that adheres to the identified first traffic rule and the legal traffic practices specified by the traffic rule profile;
    sending a first instruction to a control system of the AV, the first instruction describing a first operation of the AV according to the first driving decision; and
    controlling at least one vehicular system of the AV according to the first instruction such that the first operation accounts for the first driving decision.

8. The one or more non-transitory computer-readable storage medium of claim 7, wherein the operations further comprise:
    identifying a second traffic rule relevant to the AV based on the traffic rule profile; and
    determining a third driving decision based on the first driving decision and a second driving decision corresponding to the second traffic rule, wherein the first instruction describing the first operation of the AV is further based on the third driving decision.

9. The non-transitory computer-readable storage medium of claim 8, wherein the third driving decision results in the first operation of the AV satisfying the first driving decision and the second driving decision.

10. The non-transitory computer-readable storage medium of claim 8, wherein the third driving decision results in the given operation of the AV satisfying only the first driving decision or only the second driving decision according to a priority order.

11. The non-transitory computer-readable storage medium of claim 7, wherein the first traffic rule includes at least one of: a bike lane rule, a traffic light rule, a highway merge rule, a stop sign rule, or a construction zone rule.

12. The non-transitory computer-readable storage medium of claim 7, wherein setting up the traffic rule profile for the AV includes:
identifying the legal traffic practices associated with the geographical location; and
compiling the legal traffic practices as the traffic rule profile.

13. A system, comprising:
one or more processors; and
one or more non-transitory computer-readable storage media configured to store instructions that, in response to being executed, cause the system one or more processors to perform operations, the operations comprising:
obtaining input information relating to an environment in which an autonomous vehicle (AV) operates, the input information describing a geographical location in which the AV operates, a framework of traffic guidelines associated with the geographical location, and a configuration of roads in a vicinity of the AV;
setting up a traffic rule profile for the AV that specifies legal traffic practices corresponding to the geographical location in which the AV operates and the framework of traffic guidelines that the AV follows in the geographical location, the legal traffic practices differing according to a country, a state, or a city associated with the geographical location;
identifying a first traffic rule that applies to the AV based on the traffic rule profile and the configuration of the roads in the vicinity of the AV;
using a machine-learning process to prioritize traffic decisions made in relation to the identified traffic rule and the traffic rule profile and resolve internal conflicts between the traffic decisions;
adaptively prioritizing the traffic decisions based on a driving context so that a first traffic decision associated with a first traffic rule profile increases or decreases in priority in response to a selection or non-selection of other traffic rule profiles, wherein a separate priority ranking for conflicting traffic decisions is performed in response to two or more traffic decisions conflicting with each other;
determining a first driving decision that adheres to the identified first traffic rule and the legal traffic practices specified by the traffic rule profile;
sending a first instruction to a control system of the AV, the first instruction describing a first operation of the AV according to the first driving decision; and
controlling at least one vehicular system of the AV according to the first instruction such that the first operation accounts for the first driving decision.

14. The system of claim 13, wherein the operations further comprise:
identifying a second traffic rule relevant to the AV based on the traffic rule profile; and
determining a third driving decision based on the first driving decision and a second driving decision corresponding to the second traffic rule, wherein the first instruction describing the first operation of the AV is further based on the third driving decision.

15. The system of claim 14, wherein the third driving decision results in the first operation of the AV satisfying the first driving decision and the second driving decision.

16. The system of claim 14, wherein the third driving decision results in the first operation of the AV satisfying only the first driving decision or only the second driving decision according to a priority order.

17. The system of claim 13, wherein setting up the traffic rule profile for the AV includes:
identifying the legal traffic practices associated with the geographical location; and
compiling the legal traffic practices as the traffic rule profile.

* * * * *